(12) United States Patent
Pokroy et al.

(10) Patent No.: US 11,292,746 B2
(45) Date of Patent: Apr. 5, 2022

(54) TOUGHENED CERAMIC AND METHODS OF TOUGHENING CERAMIC

(71) Applicant: TECHNION RESEARCH & DEVELOPMENT FOUNDATION LIMITED, Haifa (IL)

(72) Inventors: Boaz Pokroy, Haifa (IL); Iryna Polishchuk, Nesher (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 16/765,280

(22) PCT Filed: Nov. 20, 2018

(86) PCT No.: PCT/IL2018/051255
§ 371 (c)(1),
(2) Date: May 19, 2020

(87) PCT Pub. No.: WO2019/097525
PCT Pub. Date: May 23, 2019

(65) Prior Publication Data
US 2020/0308055 A1    Oct. 1, 2020

Related U.S. Application Data

(60) Provisional application No. 62/588,462, filed on Nov. 20, 2017.

(51) Int. Cl.
*C04B 35/06* (2006.01)
(52) U.S. Cl.
CPC ........ *C04B 35/06* (2013.01); *C04B 2235/321* (2013.01); *C04B 2235/401* (2013.01);
(Continued)

(58) Field of Classification Search
CPC ....... C04B 35/06; C04B 35/44; C04B 35/443; C04B 2235/321
See application file for complete search history.

(56) References Cited

U.S. PATENT DOCUMENTS

| 10,513,462 B2 * | 12/2019 | Feigelson ............. C23C 16/403 |
| 2007/0259768 A1 * | 11/2007 | Kear ................... C04B 35/6455 |
| | | 501/120 |

(Continued)

FOREIGN PATENT DOCUMENTS

JP        09183669 A    7/1997

OTHER PUBLICATIONS

Yang K.C. "on the precipitation of coherent spinel nanoparticles in Ti-doped MgO" Journal of solid sate chemistry, vol. 178, is. 3, 2005. pp. 661-670. (Year: 2005).*

(Continued)

*Primary Examiner* — Karl E Group
(74) *Attorney, Agent, or Firm* — The Roy Gross Law Firm, LLC; Roy Gross

(57) ABSTRACT

Disclosed is a ceramic composition comprising a plurality of at least semi-coherent particles with an average diameter ranging from 1 nm to 50 nm included within a matrix, wherein the matrix comprises one metal carbonate salt, metal oxide or metalloid oxide, the particles and the matrix share at least one metal element and the metal element is 10% to 80% of the total content of said matrix, and the composition has a lattice mismatch of less than 5%. Disclosed are also an article and methods for making the ceramic composition of the present invention.

16 Claims, 21 Drawing Sheets

(52) U.S. Cl.
CPC ............... *C04B 2235/442* (2013.01); *C04B 2235/5454* (2013.01); *C04B 2235/781* (2013.01)

(56) References Cited

U.S. PATENT DOCUMENTS

2016/0208163 A1* 7/2016 Ning .................... C04B 35/6224
2017/0073276 A1* 3/2017 Feigelson ........... C23C 16/4417

OTHER PUBLICATIONS

Joanna Aizenberg and Gordon Hendler, "Designing efficient microlens arrays: lessons from Nature", Journal of Materials Chemistry, vol. 14 Issue 14 pp. 2066-2072, Jun. 24, 2004.
K. C. Yang and Pouyan Shen, "On the precipitation of coherent spinel nanoparticles in Ti-doped MgO", Journal of Solid State Chemistry, vol. 178 Issue 3 pp. 661-670, 2005.
Benjamin Butz et al., "Microstructure of Nanocrystalline Y-Doped Zirconia Thin Films Obtained by Sol-Gel Processing", Journal of the American Ceramic Society, vol. 91 Issue7 pp. 2281-2289, 2008.
Zuhuang Chen et al., "Self-Assembled, Nanostructured, Tunable Metamaterials via Spinodal Decomposition", ACS Nano, vol. 10 Issue 11 pp. 10237-10244, 2016.
Jean-François Hochepied, et al., "Aqueous Co-precipitated Ti0.5Sn0.5O2 Nanopowders as Precursors for Dense Spinodally Decomposed Ceramics", Journal of the American Ceramic Society, vol. 94 Issue 12 pp. 4226-4230, Dec. 2011.
A.V.Radha et al., "Energetic and structural studies of amorphous Ca1-xMgxCO3·nH2O (0<=x<=1)", Geochimica et Cosmochimica Acta, vol. 90 pp. 83-95, 2012.
Iryna Polishchuk et al., "Coherently aligned nanoparticles within a biogenic single crystal: A biological prestressing strategy", Science, vol. 358 Issue 6368 pp. 1294-1298, 2017.
Dorothy M. Duffy, "Coherent nanoparticles in calcite", Science, vol. 358 Issue 6368 pp. 1254-1255, 2017.
Laurie B. Gower, "Biomimetic model systems for investigating the amorphous precursor pathway and its role in biomineralization", Chemical reviews, vol. 108 Issue 11 pp. 4551-4627, 2008.
Carlos Capdevila et al., "Strengthening by intermetallic nanoprecipitation in Fe—Cr—Al—Ti alloy", Acta Materialia, vol. 107 pp. 27-37, 2016.
Paul H. Mayrhofer et al., "Self-Organized Nanostructures in the Ti—Al—N System", Applied Physics Letters, vol. 83 Issue 10 pp. 2049-2051, 2003.
A. H. Heuer et al., "Innovative Materials Processing Strategies—a Biomimetic Approach", Science, vol. 255 Issue 5048 pp. 1098-1105, 1992.
Lyle M. Gordon et al., "Amorphous intergranular phases control the properties of rodent tooth enamel", Science, vol. 347 Issue 6223 pp. 746-750, 2015.
John A. Raven and Andrew H. Knoll, "Non-Skeletal Biomineralization by Eukaryotes: Matters of Moment and Gravity" Geomicrobiology Journal, vol. 27 Issue 6-7 pp. 572-584, 2010.
R. Blakemore, "Magnetotactic Bacteria", Science, vol. 190 Issue 4212 pp. 377-379, 1975.
James C. Weaver et al., "The Stomatopod Dactyl Club: A Formidable Damage-Tolerant Biological Hammer", Science vol. 336 Issue 6086 pp. 1275-1280, 2012.
Vikram C. Sundar, "Fibre-optical features of a glass sponge—Some superior technological secrets have come to light from a deep-sea organism", Nature, vol. 424 Issue 6951 pp. 899-900, 2003.
E. Beniash, "Amorphous calcium carbonate transforms into calcite during sea urchin larval spicule growth", Proc. Royal Soc. Lond. B: Biol Sciences, vol. 264 Issue 1380 pp. 461-465, 1997.
Yael Politi, "Sea urchin spine calcite forms via a transient amorphous calcium carbonate phase", Science, vol. 306 Issue 5699 pp. 1161-1164, 2004.
Nicolas Vogel et al., "Color from hierarchy: Diverse optical properties of micron-sized spherical colloidal assemblies", P. Natl. Acad. Sci. USA, vol. 112 Issue 35 pp. 10845-10850, 2015.

O.B.M. Hardouin Duparc, "The Preston of the Guinier-Preston Zones Guinier", Metallurgical and Materials Transactions, vol. A 41A pp. 1873-1882, 2010.
J. Aizenberg et al., "Calcitic microlenses as part of the photoreceptor system in brittlestars", Nature, vol. 412 Issue 6849 pp. 819-822, 2001.
Gordon Hendler and Maria Byrne, "Fine structure of the dorsal arm plate of Ophiocoma wendti: evidence for a photoreceptor system (Echinodermata, Ophiuroidea)", Zoomorphology, vol. 107 pp. 261-272, 1987.
E. Zolotoyabko et al., "Differences between bond lengths in biogenic and geological calcite", Cryst. Growth. Des., vol. 10 Issue 3 pp. 1207-1214, 2010.
Boaz Pokroy et al., "Anisotropic lattice distortions in biogenic calcite induced by intra-crystalline organic molecules" J. Struct. Biol., vol. 155 Issue 1 pp. 96-103, 2006.
R. I. Harker and O. F. Tuttle, "Studies in the system CaO—MgO—CO2; Part 2, Limits of solid solution along the binary join CaCO3-MgCO 3", American Journal of Science, vol. 253 Issue 5 pp. 274-282, 1955.
Peter Fratzl et al., "Modeling of phase separation in alloys with coherent elastic misfit", Journal of Statistical Physics, vol. 95 pp. 1429-1503, 1999.
T. Mori, K. Tanaka, "Average stress in matrix and average elastic energy of materials with misfitting inclusions", Acta Metallurgica, vol. 21 pp. 571-574, 1973.
Boaz Pokroy and Emil Zolotoyabko, "Aragonite growth on single-crystal substrates displaying a threefold axis", Chemical Communications, vol. 16 pp. 2140-2142, 2005.
P. N. T. Unwin et al., "The origin of the grain boundary precipitate free zone", Acta Metallurgica, vol. 17 Issue 11 pp. 1363-1377, 1969.
S. M. Wise et al., "Surface-directed spinodal decomposition in a stressed, two-dimensional, thin film", Thin Solid Films, vol. 473 Issue 1 pp. 151-163, 2005.
B. Aichmayer et al., "Surface-directed spinodal decomposition on a macroscopic scale in a nitrogen and carbon alloyed steel", Physical Review Letters, vol. 91 Issue 1, p. 015701, 2003.
Brian Lawn and Rodney Wilshaw, "Indentation Fracture—Principles and Applications", Journal of Materials Science, vol. 10 pp. 1049-1081, 1975.
A. G. Evans and E. A. Charles, "Fracture toughness determinations by indentation", Journal of the American Ceramic Society, vol. 59 Issue pp. 371-372, 1976.
M. E. Kunitake et al., "Evaluation of strengthening mechanisms in calcite single crystals from mollusk shells", Acta Biomater, vol. 9 Issue 2 pp. 5353-5359, 2013.
Otmar Kolednik et al., "Bioinspired Design Criteria for Damage-Resistant Materials with Periodically Varying Microstructure", Adv. Funct. Mater., vol. 21 pp. 3634-3641, 2011.
D. E. Grady and R. E. Hollenbach, "Dynamic fracture strength of rock", Geophys. Res. Lett., vol. 6 Issue 2 pp. 73-76, 1979.
Boaz Pokroy et al., "Nacre in Mollusk Shells as a Multilayered Structure with Strain Gradient", Adv. Funct. Mater., vol. 19 Issue 7 pp. 1054-1059, 2009.
Jean-Baptiste Forien et al., "Compressive Residual Strains in Mineral Nanoparticles as a Possible Origin of Enhanced Crack Resistance in Human Tooth Dentin", Nano Lett., vol. 15 Issue 6 pp. 3729-3734, 2015.
Brian H. Toby and Robert B. Von Dreele, "GSAS-II: the genesis of a modern open-source all purpose crystallography software package", J. Appl. Crystallogr., vol. 46 Issue 2 pp. 544-549, 2013.
Ross T. DeVol et al., "Nanoscale Transforming Mineral Phases in Fresh Nacre", J. Am. Chern. Soc., vol. 137 Issue 41 pp. 13325-13333, 2015.
Yutao U. T. Gong et al., "Phase transitions in biogenic amorphous calcium carbonate", Proc. Natl. Acad. Sci. USA, vol. 109 Issue 16 pp. 6088-6093, 2012.
Benjamin Gilbert, "GG-Macros", Gilbert Group Macros,— download at http://home.physics.wisc.edu/gilbert/software.htm, 2016.
Rebecca A. Metzler et al., "Asprich peptides are occluded in calcite and permanently disorder biomineral crystals", J. Am. Chem. Soc., vol. 132 Issue 33 pp. 11585-11591, 2010.

(56) References Cited

OTHER PUBLICATIONS

Gelsomina De Stasio et al., "Compensation of charging in X-PEEM: a successful test on mineral inclusions in 4.4 Ga old zircon", Ultramicroscopy, vol. 98 Issue 57-62, 2003.
Matthew A. Marcus et al., "Beamline 10.3.2 at ALS: a hard X-ray microprobe for environmental and materials sciences", J. Synchrotron Radiat., vol. 11 Pt 3 pp. 239-247, 2014.
P. Pfalzer et al., "Elimination of self-absorption in fluorescence hard-x-ray absorption spectra", Phys. Rev., vol. B 60 pp. 9335-9339, 1999.
Ross T. DeVol et al., "Oxygen spectroscopy and Polarization-dependent Imaging Contrast (PIC)-mapping of calcium carbonate minerals and biominerals", J. Phys. Chem. B, vol. 118 Issue 28 pp. 8449-8457, 2014.
B. Ravel and M. Newville, "Athena, Artemis, Hephaestus: data analysis for X-ray absorption spectroscopy using IFEFFIT", J. Synchrotron Rad., vol. 12 Pt 4 pp. 537-541, 2005.
W. C. Oliver and G. M. Pharr, "An improved technique for determining hardness and elastic modulus using load and displacement sensing indentation experiments", J. Mater. Res., vol. 7 Issue 6 pp. 1564-1583, 1992.
W. C. Oliver and G. M. Pharr, "Measurement of hardness and elastic modulus by instrumented indentation: Advances in understanding and refinements to methodology", J. Mater. Res., vol. 19 Issue 1 pp. 3-20, 2004.
G. Martinez-Criado et al., "ID16B: a hard X-ray nanoprobe beamline at the ESRF for nano-analysis", J. Synchrotron Rad., vol. 23 pp. 344-352, 2016.
P. Cloetens et al., "Holotomography: Quantitative phase tomography with micrometer resolution using hard synchrotron radiation x rays", Appl. Phys. Lett., vol. 75 Issue 19 pp. 2912-2914, 1999.
Johannes Schindelin et al., "Fiji: an open-source platform for biological-image analysis", Nat. Methods, vol. 9 pp. 676-682, 2012.
J. W. Morris Jr., "The Khachaturyan theory of elastic inclusions: Recollections and results", Philos. Mag., vol. 90 pp. 3-35, 2010.
C. C. Chen et al., "Elasticity of single-crystal calcite and rhodochrosite by Brillouin spectroscopy", Am. Mineral., vol. 86, Issue 11-12 pp. 1525-1529, 2001.
Admir Masic and James C. Weaver, "Large area sub-micron chemical imaging of magnesium in sea urchin teeth", J. Struct. Biol., vol. 189, Issue 3 pp. 269-275, 2015.
Boaz Pokroy et al.: "Anisotropic lattice distortions in the mollusk-made aragonite: A widespread phenomenon", Journal of Structural Biology, vol. 153, Issue 2, Feb. 2006, pp. 145-150.
Ling Li et al: "Multifunctionality of chiton biomineralized armor with an integrated visual system", Science, Nov. 20, 2015: vol. 350, Issue 6263, pp. 952-956.
A. Herman et al: "Interactions of sea-urchin skeleton macromolecules with growing calcite crystals—a study of intracrystalline proteins", Nature vol. 331, pp. 546-548 (1988).
Peter Fratzl and Richard Weinkamer: "Nature's hierarchical materials", Progress in Materials Science, vol. 52, Issue 8, Nov. 2007, pp. 1263-1334.
André R. Studart: "Biological and Bioinspired Composites with Spatially Tunable Heterogeneous Architectures", Advanced Functional Materials, vol. 23, Issue 36, Special Issue: New Materials through Bioinspiration and Nanoscience, Sep. 25, 2013, pp. 4423-4436.
PCT Search Report for International Application No. PCT/IL2018/051255, dated Mar. 17, 2019, 5 pp.
PCT Written Opinion for International Application No. PCT/IL2018/051255, dated Mar. 17, 2019, 9 pp.
PCT Preliminary Report on Patentability for International Application No. PCT/IL2018/051255, dated May 26, 2020, 10 pp.

* cited by examiner

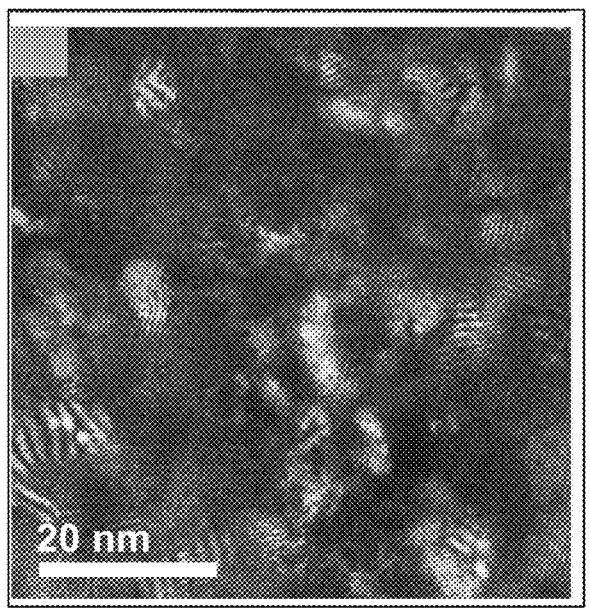 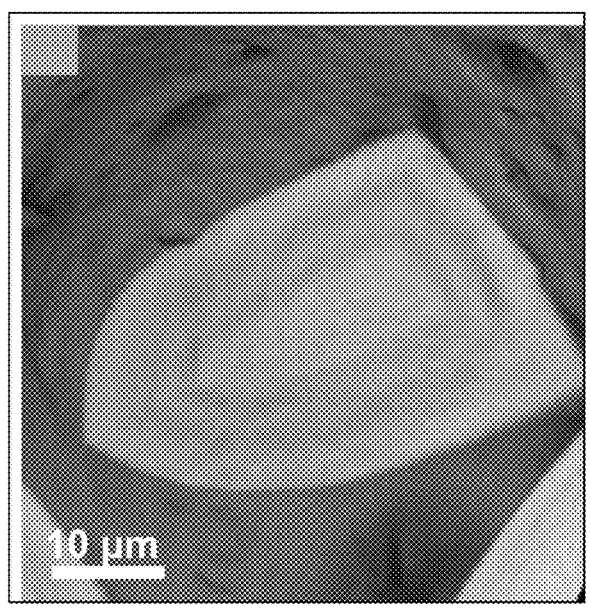
Figure 2E                    Figure 2F ial patent number header omitted>

TOUGHENED CERAMIC AND METHODS OF TOUGHENING CERAMIC

CROSS REFERENCE TO RELATED APPLICATIONS

This application is a national phase of PCT Patent Application No. PCT/IL2018/051255 having International filing date of Nov. 20, 2018, which claims the benefit of priority of U.S. Provisional Patent Application No. 62/588,462 filed on Nov. 20, 2017, the contents of which are incorporated herein by reference in their entirety.

FIELD OF THE INVENTION

The present invention is in the field of material science.

BACKGROUND OF THE INVENTION

There is a need and a demand for routes for toughening brittle ceramics to permit their use such as in engineering applications. Compressive stress is known to be the most effective means of strengthening and toughening ceramic materials; two classical examples are prestressed concrete and tempered glass. However, all synthetic routs to exert toughening compressive stress require out-of-equilibrium high energy thermodynamic processes such as heating and quenching and cannot be achieved at ambient conditions which significantly limits wide implementation of these methods.

SUMMARY OF THE INVENTION

There is provided, in accordance with some embodiments, a ceramic composition comprising a plurality of at least semi-coherent particles with an average diameter ranging from 1 nm to 50 nm included within a matrix, wherein: the matrix comprises one metal carbonate salt, metal oxide or metalloid oxide; the particles and the matrix share at least one metal element and the metal element is 10% to 80 mol % of the total metal content of the matrix; and the composition has a lattice mismatch of less than 5%.

In some embodiments, the matrix is crystal matrix.

In some embodiments, the composition has a Young's modulus of at least 50 GPa.

In some embodiments, the composition has a hardness of at least 1 GPa.

In some embodiments, the matrix comprises a calcium rich matrix and the nanoparticles are magnesium rich particles.

In some embodiments, the concentration of magnesium in the particles is in the range of 5 at % to 40 at %.

In some embodiments, the matrix comprises calcium carbonate.

In some embodiments, the matrix comprises magnesium.

In some embodiments, the concentration of magnesium in the matrix is in the range of 0 mol % to 90 mol %.

In some embodiments, the nanoparticles have an average diameter in the range of 1 nm to 20 nm.

In some embodiments, the nanoparticles have an average diameter in the range of 1 nm to 9 nm.

In some embodiments, the composition comprises at least two layers.

There is provided, in accordance with some embodiments, an article comprising the composition as described herein.

There is provided, in accordance with some embodiments, a method for making the ceramic composition of the present invention, comprising the steps of: mixing at least two amorphous materials; providing conditions for the amorphous materials undergo spinodal decomposition and allowing crystallization under a controlled manner.

In some embodiments, the amorphous materials are soluble above a critical temperature.

In some embodiments, the amorphous materials are soluble in each other in the crystalline phase.

In some embodiments, at least two amorphous materials are used in a ratio of 1:99 to 99:1.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 2A-F present images of the characterization from the micro- to the nanostructure: scanning electron microscopy image showing an entire dorsal arm plate and a higher magnification inset (FIG. 2A); transmission electron microscopy (TEM) image of a thin section from a lens revealing brighter nanodomains, although the FFT pattern is that of a single crystal (FIG. 2B); higher magnification of an area in B shows a lattice image undisrupted by the nanodomains, which demonstrate coherent interfaces with the lattice by the continuous lattice fringes (FIG. 2C), the inset shows an electron diffraction image from this area; bright-field TEM image obtained during in-situ heating at 450° C., revealing the temperature-dependent growth of the nanodomains (FIG. 2D); dark-field high-resolution TEM (HRTEM) acquired using the diffracted beam marked by the diffraction spot in the square in FIG. 2C, and demonstrating numerous strain fringes (FIG. 2E); and a virtual slice within a single lens produced by 3D X-Ray nano-computed tomography (nanoCT), revealing alternating density layers probably owing to varying nanoprecipitate content (FIG. 2F);

FIG. 7A presents TEM image of a sample from the brittlestar lens after heating for 30 min at 300° C. so as to enlarge the nanoparticles; and FIG. 7B presents energy filtered TEM of the same area with artificially added color. Blue: image produced with electrons that have the energy that fits that of Ca L2,3-edge. Yellow: image produced with electrons that have the energy that fits that of Mg L2,3-edge. It can be seen that the particles have a stronger yellow component as compared to areas of the matrix.

DETAILED DESCRIPTION OF THE INVENTION

Figure 1A:
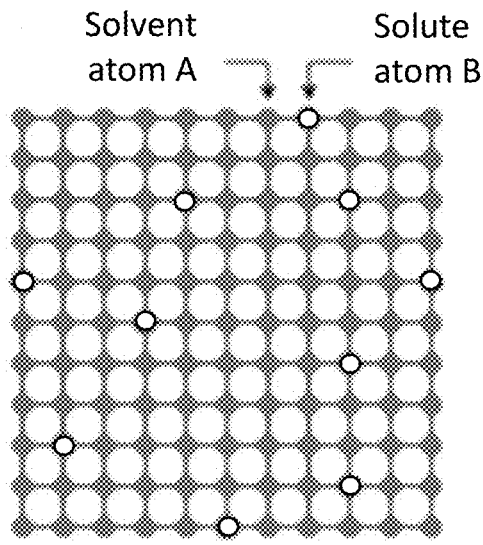
FIGS. 1A-C presents images of formation of the Guinier-Preston zones (GP) and coherent interface as an example of a A-B binary system, followed by loss of coherent interface once the precipitates are larger than some critical size; solid solution supersaturated with element A (FIG. 1A), coherent zones or precipitate phase (formed during "aging") with lattice distortion (FIG. 1B), and equilibrium phase without distortion and non-coherent interface (FIG. 1C).
Figure 1B:
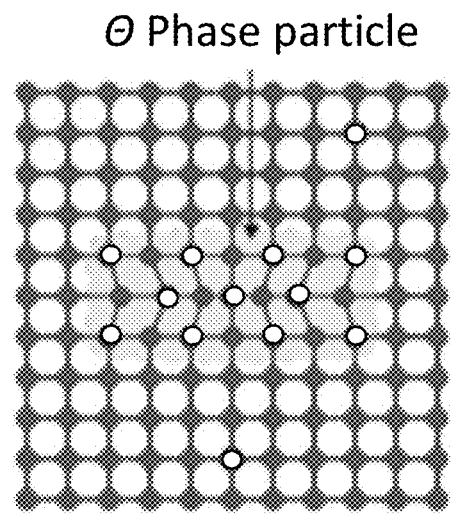
Figure 1C:
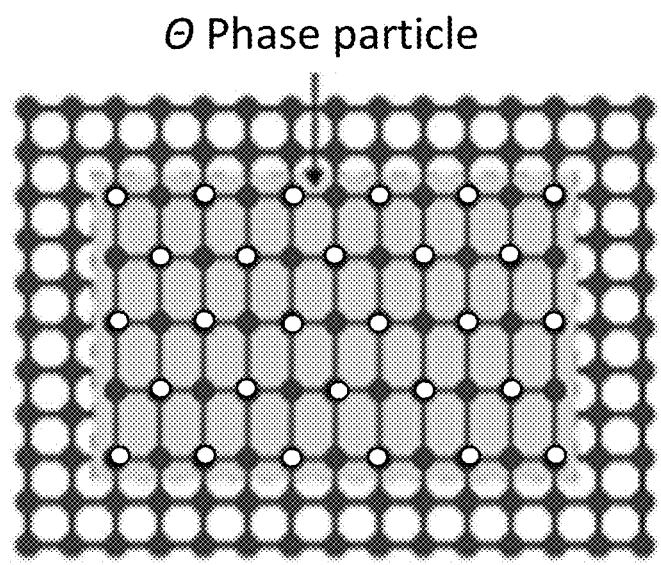

According to some embodiments, there is provided a ceramic composition comprising a plurality of at least semi-coherent particles included within a matrix.

According to some embodiments, there is provided a ceramic composition comprising a plurality of at least semi-coherent particles with an average diameter size ranging from 1 nm to 50 nm included within a matrix.

According to some embodiments, there is provided a ceramic composition comprising a plurality of at least semi-coherent particles with an average diameter size ranging from 1 nm to 50 nm included within a matrix, wherein: the matrix comprises one metal carbonate salt, metal oxide or metalloid oxide; the particles and the matrix share at least one metal element and the metal element is in the range of 10% to 80 mol % of the total metal content of the matrix; and the composition has a lattice mismatch of less than 5%. In some embodiments, a matrix is a crystal matrix.

Composition

In some embodiments, there is provided ceramic compositions characterized by the presence of dispersed precipitates of an element-rich particle dispersed throughout the alloy matrix. In some embodiments, the particles are at least semi-coherent with the matrix. In some embodiments, the particles are coherent with the matrix.

As used herein "at least semi-coherent" refers to semi-coherent, coherent or any combination thereof.

In some embodiments, semi-coherent refers to particles with at least 50%, at least 55%, at least 60%, at least 65%, at least 70%, at least 75%, at least 80%, at least 85%, at least 90%, at least 95%, or at least 99% coherency with the matrix. In some embodiments, coherent particles refer to particles with at least at least 95%, at least 99%, or 100% coherency with the matrix.

In some embodiments, a ceramic composition as described herein comprises at least semi-coherent particles with different degrees of coherency. In some embodiments, an element-rich particle refers to a particle comprising at least 30%, at least 40%, at least 50%, at least 60%, at least 70%, at least 80%, at least 90%, at least 95% or 100% content of the element, including any value therebetween.

In some embodiments, a ceramic composition as described herein comprises areas with alternating density. As used herein the term "density" refers to the precipitate content in the composition. In some embodiments, a ceramic composition comprises precipitate-free areas. In some embodiments, a ceramic composition comprises alternating precipitate-rich and nanoprecipitate-depleted areas.

In some embodiments, the content of a precipitate in a precipitate-rich area is least 30%, at least 40%, at least 50%, at least 60%, at least 70%, at least 80%, at least 90%, at least 95% or 100% of the total area, including any value therebetween.

In some embodiments, the content of a precipitate in a precipitate-depleted area is less than 50%, less than 40%, less than 30%, less than 20%, less than 10%, less than 5%, or less than 1%, of the total area, including any value therebetween.

According to some embodiments, there is provided a ceramic composition comprising a plurality of at least semi-coherent particles with an average diameter size ranging from 1 nm to 50 nm included within a matrix.

In some embodiments, at least semi-coherent particles according to the present invention have an average diameter in the range of 1 nm to 49 nm, 1 nm to 48 nm, 1 nm to 47 nm, 1 nm to 46 nm, 1 nm to 46 nm, 1 nm to 45 nm, 1 nm to 44 nm, 1 nm to 43 nm, 1 nm to 42 nm, 1 nm to 41 nm, 1 nm to 40 nm, 1 nm to 39 nm, 1 nm to 38 nm, 1 nm to 37 nm, 1 nm to 36 nm, 1 nm to 34 nm, 1 nm to 33 nm, 1 nm to 32 nm, 1 nm to 31 nm, 1 nm to 30 nm, 1 nm to 29 nm, 1 nm to 28 nm, 1 nm to 27 nm, 1 nm to 26 nm, 1 nm to 24 nm, 1 nm to 23 nm, 1 nm to 22 nm, 1 nm to 21 nm, 1 nm to 20 nm, 1 nm to 19 nm, 1 nm to 18 nm, 1 nm to 17 nm, 1 nm to 16 nm, 1 nm to 15 nm, 1 nm to 14 nm, 1 nm to 13 nm, 1 nm to 12 nm, 1 nm to 11 nm, 1 nm to 10 nm, or 1 nm to 9 nm.

In some embodiments, at least semi-coherent particles according to the present invention have an average diameter of less than 100 nm, less than 95 nm, less than 90 nm, less than 80 nm, less than 70 nm, less than 65 nm, less than 60 nm, or less than 55 nm, including any value therebetween.

As used herein the term "ceramic" refers to a material that contains ceramic material or is wholly ceramic in nature. The term "ceramic" is used in its conventional sense to indicate a nonmetallic, inorganic material such as a metal oxide. In some embodiments, the term "ceramic" as used herein encompasses composites, containing both ceramic and nonceramic material, as well as materials that are entirely ceramic and do not contain any nonceramic material.

As used herein, the terms "particle", "nanoparticle" and "nanoprecipitate" are used interchangeably to refer to any particle having a diameter of less than 1000 nm.

As used herein, the term "microcomponent" refers to a three-dimensional solid structure whose height, width (or diameter) or length is less than about 100 microns, i.e., at least one dimension of the three-dimensional structure is less than about 100 microns.

In some embodiments, a matrix according to the present invention comprises one metal carbonate salt, metal oxide or metalloid oxide. In some embodiments, a matrix is a crystal matrix.

Ceramic materials that can be used in conjunction with the present invention include: metal oxides such as $Al_2O_3$, $ZrO_2$, $TiO_2$, $ZnO$, $SiO_2$, $BaTiO_3$, $BaZrO_3$, $SrTiO_3$, $WO_2$, $WO_3$, $Fe_2O_3$, $Fe_3O_4$, $Ca_5(PO_4)OH$, $MnFe_2O_4$, $PbZr_{0.5}Ti_{0.5}O_3$, $BaFe_{12}O_{19}$, $CrO_2$, $Cr_2O_3$, $ZrO_2$, $HfO_2$, $GeO_2$, $ZnCO_3$, $MnCO_3$, $FeCO_3$, $NiCO_3$, $MoO_2$ and $MoO_3$; calcium carbonate, magnesium carbonate, silicon-containing ceramics such as $SiO_2$, $SiC$, $Si_3N_4$ and $Si_2ON_2$; aluminum nitride; tungsten carbide; samarium cobalt ($SmCo_5$); neodymium iron boride (NdFeB); TiC; TiN; $MoSe_2$; $MoSe_3$; $MoS_2$; and $MoS_3$. Certain ceramic materials can provide a specific function in a particular context, the context may dictate choice of material.

In some embodiments, a matrix comprises a calcium rich matrix. In some embodiments, nanoparticles are magnesium rich particles.

In some embodiments, the concentration of magnesium in the particles is in the range of 5 mol % to 100 mol %. In some embodiments, the concentration of magnesium in the particles is in the range of 10 mol % to 100 mol %, 15 mol % to 100 mol %, 20 mol % to 100 mol %, 25 mol % to 100 mol %, 30 mol % to 100 mol %, 35 mol % to 100 mol %, 40 mol % to 100 mol %, 45 mol % to 100 mol %, 50 mol % to 100 mol %, 55 mol % to 100 mol %, 10 mol % to 98 mol %, 10 mol % to 95 mol %, 10 mol % to 90 mol %, 10 mol % to 85 mol %, 10 mol % to 80 mol %, 10 mol % to 75 mol %, 10 mol % to 70 mol %, 10 mol % to 65 mol %, 10 mol % to 60 mol %, 10 mol % to 65 mol %, or 10 mol % to 50 mol %, including any range therebetween.

In some embodiments, a matrix comprises calcium carbonate. In some embodiments, a matrix comprises magnesium.

In some embodiments, the concentration of magnesium in the matrix is in the range of 0 mol % to 90 mol %. In some embodiments, the concentration of magnesium in the matrix is in the range of 1 mol % to 90 mol %, 5 mol % to 90 mol %, 10 mol % to 90 mol %, 15 mol % to 90 mol %, 20 mol % to 90 mol %, 25 mol % to 90 mol %, 30 mol % to 90 mol %, 40 mol % to 90 mol %, 50 mol % to 90 mol %, 0 mol % to 85 mol %, 0 mol % to 80 mol %, 0 mol % to 70 mol %, 0 mol % to 60 mol %, or 0 mol % to 50 mol %, including any range therebetween.

In some embodiments, a matrix and a particle according to the present invention share at least one metal element. In some embodiments, a metal element is 10 mol % to 80 mol % of the total metal content of the matrix. In some embodiments, a metal element is 10 mol % to 79 mol %, 10 mol % to 76 mol %, 10 mol % to 75 mol %, 10 mol % to 73 mol %, 10 mol % to 70 mol %, 10 mol % to 69 mol %, 10 mol % to 66 mol %, 10 mol % to 65 mol %, 10 mol % to 63 mol %, 10 mol % to 60 mol %, 10 mol % to 59 mol %, 10 mol % to 56 mol %, 10 mol % to 55 mol %, 10 mol % to 53 mol %, 10 mol % to 50 mol %, 10 mol % to 45 mol %, 10 mol % to 40 mol %, 15 mol % to 80 mol %, 20 mol % to 80 mol %, 25 mol % to 80 mol %, 30 mol % to 80 mol %, 35 mol % to 80 mol %, or 40 mol % to 80 mol % of the total meta content of the matrix, including any range therebetween.

In some embodiments, a ceramic composition according to the present invention has a lattice mismatch of less than 5%. In some embodiments, a ceramic composition according to the present invention has a lattice mismatch of less than 4.9%, less than 4.8%, less than 4.7%, less than 4.6%, less than 4.5%, less than 4%, less than 4.7%, less than 4.6%, less than 4.5%, less than 4%, less than 3.7%, less than 3.6%, less than 3.5%, less than 3%, less than 2.7%, less than 2.6%, less than 2.5%, less than 2%, less than 1.7%, less than 1.6%, less than 1.5%, less than 1%, or less than 0.5%, including any value therebetween.

In some embodiments, a ceramic composition according to the present invention has a lattice mismatch in the range of 0.01% to 5%, 0.05% to 5%, 0.1% to 5%, 0.5% to 5%, 0.9% to 5%, 1% to 5%, or 2% to 5%, including any range therebetween.

As used herein, the term "mismatch" refers to a parameter known to persons skilled in the art and is defined by the following relationship: ((lattice parameter of the precipitate−lattice parameter of the alloy matrix)÷(lattice parameter of alloy matrix))×100%. A coherent interface between the matrix material and the precipitates is necessary to obtain a stable microstructure and is produced when the absolute value of the mismatch parameter is as small as possible. The strengthening and toughening of ceramic compositions depend upon coherent nanoparticles within a matrix. These nanoparticles exert compressive strains on the matrix but are themselves under a high tensile strain.

In some embodiments, a ceramic composition according to the present invention has a Young's modulus of at least 50 GPa. In some embodiments, a ceramic composition according to the present invention has a Young's modulus of at least 55 GPa, at least 60 GPa, at least 65 GPa, at least 70 GPa, at least 75 GPa, at least 80 GPa, at least 85 GPa, at least 90 GPa, at least 95 GPa, at least 100 GPa, at least 200 GPa, at least 300 GPa, at least 400 GPa, or at least 500 GPa, including any value therebetween.

In some embodiments, a ceramic composition according to the present invention has a Young's modulus in the range of 50 GPa to 500 GPa, 55 GPa to 500 GPa, 60 GPa to 500 GPa, 70 GPa to 500 GPa, 80 GPa to 500 GPa, 90 GPa to 500 GPa, 100 GPa to 500 GPa, 150 GPa to 500 GPa, 200 GPa to 500 GPa, 50 GPa to 450 GPa, 50 GPa to 400 GPa, 50 GPa to 350 GPa, 50 GPa to 300 GPa, 50 GPa to 250 GPa, or 50 GPa to 200 GPa, including any range therebetween.

In some embodiments, a ceramic composition according to the present invention has a hardness of at least 1 GPa. In some embodiments, a ceramic composition according to the present invention has a hardness of at least 5 GPa, at least 15 GPa, at least 20 GPa, at least 25 GPa, at least 30 GPa, at least 35 GPa, at least 40 GPa, at least 45 GPa, at least 50 GPa, 55 GPa, at least 60 GPa, at least 65 GPa, at least 70 GPa, at least 75 GPa, at least 80 GPa, at least 85 GPa, at least 90 GPa, at least 95 GPa, at least 100 GPa.

In some embodiments, a ceramic composition according to the present invention has a hardness in the range of 1 GPa to 100 GPa, 5 GPa to 100 GPa, 15 GPa to 100 GPa, 20 GPa to 100 GPa, 30 GPa 100 GPa, 40 GPa to 100 GPa, 60 GPa to 100 GPa, 70 GPa 100 GPa, or 80 GPa to 100 GPa, including any range therebetween.

"Hardness" may be determined by the Berkovich hardness test, which is measured in GPa and employs a nano-indenter tip used for testing the indentation hardness of a material. Also, for purposes herein, the phrase "elastic modulus" is intended to refer to the Young's Modulus, which may also be measured in GPa. As used herein, the term "Young's Modulus" refers to a quantification of the stiffness of a given material. Young's modulus, E, can be calculated by dividing the tensile stress by the tensile strain.

In some embodiments, ceramic compositions according to the present invention show interconnected structure typical of spinodal decomposition. In some embodiments, the degree of interconnectivity is controlled. In some embodiments, the degree of interconnectivity depends on the used amount of each component. In some embodiments, the degree of interconnectivity depends on the thermal history.

In some embodiments, alloys used according to the present invention exhibit continuous, homogeneous precipitation of coherent particles upon precipitation hardening.

In some embodiments, a ceramic composition according to the present invention comprises precipitates coherently conjugated with the matrix. In some embodiments, a ceramic composition according to the present invention comprises precipitates semi-coherently conjugated with the matrix.

As used herein the term "coherent", "coherently" are used interchangeably herein to refer to a particles or precipitates having a whole interface coherent with a matrix, i.e., there is a one-to-one matching of the lattice planes across the interface. This generally produces elastic lattice-strains called coherency-strains around the boundary where the lattice planes must be 'bent' to give this one-to-one matching. In an incoherent boundary, there is no regularity of lattice-plane matching across the boundary, i.e., there is no coherent boundary. As used herein the term "semi-coherent" refers to a boundary that consists alternately of region of coherency and region of disregistry (region around dislocation). In some embodiments, a semi-coherent precipitate is at least 50%, at least 55%, at least 60%, at least 65%, at least 70%, at least 75%, at least 80%, at least 85%, at least 90%, at least 95%, or at least 99% coherent with the matrix.

In some embodiments, a precipitate is at least 50%, at least 55%, at least 60%, at least 65%, at least 70%, at least 75%, at least 80%, at least 85%, at least 90%, at least 95%, at least 99% or 100% coherent with the matrix, including any value therebetween. In some embodiments, a coherent precipitate has 100% coherency with the matrix.

In some embodiments, a ceramic composition according to the present invention comprises at least two layers. In some embodiments, at least two layers comprises 3, 4, 5, 6, 7, 8, 9, 10, 50, 100, 200, 500, 1000, 5000 or 10000 layers, including any value therebetween. In some embodiments, at least one two layers comprises 2 to 10000, 2 to 5000, 2 to 1000, 4 to 1000, 5 to 1000, 10 to 1000, 100 to 1000, or 100 to 10000 layers, including any range therebetween. In some embodiments, a ceramic composition comprises stacked layers. In some embodiments, a ceramic composition comprises parallel layers.

In some embodiments, a ceramic composition as described herein comprises layers with alternating density. As used herein the term "density" refers to the nanoprecipitate content in each layer. In some embodiments, a ceramic composition comprises layers with nanoprecipitate-free zones. In some embodiments, a ceramic composition comprises alternating nanoprecipitate-rich and nanoprecipitate-depleted layers.

In some embodiments, the presence of at least semi-coherent nanoparticles in a ceramic composition according to the present invention, improves the strength of the material 1 fold, 5 fold, 10 fold, 20 fold, 25 fold, 50 fold, 100 fold, 200 fold, 500 fold, 1000 fold, 1500 fold, 2000 fold, 5000 fold, or 10000 fold, compared to the strength of similar material without coherent nanoparticles.

In some embodiments, the presence of coherent nanoparticles in a ceramic composition according to the present invention, improves the strength of the material 1 fold, 5 fold, 10 fold, 20 fold, 25 fold, 50 fold, 100 fold, 200 fold, 500 fold, 1000 fold, 1500 fold, 2000 fold, 5000 fold, or 10000 fold, compared to the strength of similar material without coherent nanoparticles.

Article

According to an aspect of some embodiments of the present invention, there is provided an article comprising a ceramic composition as described herein.

In some embodiments, an article comprises at least two layers.

In some embodiments, at least two layers comprises 3, 4, 5, 6, 7, 8, 9, 10, or 50 layers, including any value therebetween. In some embodiments, at least two layers are stacked. In some embodiments, a composition as described herein is part of an outer layer, an inner layer or both. In some embodiments, an article comprises a coating.

In some embodiments, an article comprising a composition according to the present invention, has a strength of 1 fold, 5 fold, 10 fold, 20 fold, 25 fold, 50 fold, 100 fold, 200 fold, 500 fold, 1000 fold, 1500 fold, 2000 fold, 5000 fold, or 10000 fold, higher than a similar article without the composition according to the present invention, including any value therebetween.

In some embodiments, a composition according to the present invention is part of an article inner surface, outer surface or both.

In some embodiments, an article as described herein can be incorporated into a composite, an optical device, optical coatings, an engine, thermal coatings and biomaterials such as implants.

Method

According to an aspect of some embodiments of the present invention, there is provided a method for making a ceramic composition with improved strength. According to an aspect of some embodiments of the present invention, there is provided a method for making a ceramic composition as described herein. In some embodiments, there is provided a method for making a ceramic composition as described herein comprising the steps of: mixing at least two amorphous materials; providing conditions for the amorphous materials undergo spinodal decomposition and allowing crystallization under a controlled manner.

In some embodiments, the amorphous materials are soluble above a critical temperature.

In some embodiments, the amorphous materials are soluble in each other in the crystalline phase.

In some embodiments, the amorphous materials are supersaturated. As used herein the term "supersaturated" refers to amorphous precursors which, relative to the ensuing crystalline phase, are supersaturated with at least one component.

In some embodiments, the amorphous materials system allows phase separation into two coexisting phases, that have the same crystal structure and similar but not identical lattice parameters. In some embodiments, identical lattice parameters refer to between 50% to 99% similarity.

In some embodiments, the amorphous materials are used in a ratio of 1:99 to 99:1. In some embodiments, the amorphous materials are used in a ratio of 1:99 to 99:1, 10:99 to 99:1, 20:99 to 99:1, 30:99 to 99:1, 40:99 to 99:1, 50:99 to 99:1, 60:99 to 99:1, 1:80 to 99:1, 1:70 to 99:1, 1:60 to 99:1, 1:50 to 99:1, 1:40 to 99:1, 1:20 to 99:1, or 1:10 to 99:1, including any range therebetween.

In some embodiments, there is provided a method characterized by spinodal phase separation followed by crystallization of phases at very different length scales. In some embodiments, there is provided a method for making ceramic compositions via continuous, coherent precipitation such as spinodal decomposition.

As used herein the term "spinodal decomposition" refers to a process of diffusion controlled, homogeneous phase separation which takes place in a solid solution whose composition and temperature is within the coherent spinodal of a miscibility gap within the two-phase region of an alloy. A phase diagram for a binary system, in which two solid solutions of similar crystallographic structure are in equilibrium, indicates a solid-state miscibility gap when an alloy is cooled into the two-phase field so that it decomposes into the two phases. Associated with the equilibrium miscibility gap is the coherent solvus or coherent miscibility gap below which the two phases can separate coherently into the two phases. This is analogous to the situation in any two-phase region where there is a coherent solvus line associated with the equilibrium solvus. Below this coherent solvus, the precipitate or second phase of the alloy system will form coherently in the matrix. The second phase forms in alignment with the crystal structure of the matrix with little distortion at the precipitate/matrix interface. Associated with this coherent solvus line is the spinodal line, below which the reaction to provide coherent precipitates via spinodal decomposition will take place.

General

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials and Methods

Sample Collection and Preparation

*Ophiocoma wendtii* were collected in Belize and preserved in 85% non-denatured ethanol prior to the experiments. Before any further measurements specimens were treated to remove tissue and other organic material from the surface of the skeleton, and to dissociate the ossicles and isolate individual dorsal arms plates. The arms of *Ophiocoma wendtii* were cut into segments and placed in a solution of deionized water (DI) and sodium hypochlorite (NaOCl, 10-15% solution), at varying concentrations and for various periods. Best results were obtained by submersion in a 2:1 concentration of NaOCl:DI water for 6 hrs. To avoid the dissolution of calcite samples 2% sodium carbonate $Na_2CO_3$ was added to all solutions.

Material Characterization

High Resolution Scanning Electron Microscopy (HRSEM). General SEM images for sample investigation were taken using a Zeiss Ultra-Plus FEG-SEM. A Schottky field emission gun scanning electron microscope with magnification ×12 to ×1,500,000; accelerating voltage, 200 V-30 kV, and probe current 4 pA-20 nA. Uncoated samples were imaged under a 1 keV beam current, otherwise charging would disrupt the imaging. Samples coated in carbon could withstand 5-10 keV without charging.

Focused Ion Beam (FIB) Microscopy. Thin transmission electron microscopy (TEM) samples were prepared with FEI Strata 400S Dual Beam system, a fully digital FEG-SEM equipped with FIB technology. Several samples were prepared: cross sections along horizontal direction of individual dorsal arm plate, cross sections along vertical direction, slices cut from powder samples.

Energy-Dispersive X-ray Spectroscopy (EDX). EDX measurements were conducted on the lens regions of dorsal arm plates with FEI E-SEM Quanta 200. Measurements were taken with a 20 keV beam, under a low vacuum of 0.3 Torr.

Electron Probe Micro Analysis (EPMA). The analysis was done using a Cameca SX Five FE, in the Geoscience Department at the University of Wisconsin, Madison, after coating the reference dolomite samples with carbon, and the same *Ophiocoma wendtii* lenses and sea urchin teeth analyzed in PEEM. The inventors operated the instrument at 15 kV and 10 nAmp, and defocusing the beam to 1 μm. Simulations showed 3-4 μm for Mg $K_\alpha$ lateral resolution, due to scattering and X-ray absorption for an assumed composition of $Mg_{0.25}Ca_{0.75}CO_3$. Simulations with 40 nm and 500 nm beams gave identical results. The 1 μm beam used here also gave similar results, judging from the 4 μm crater observed in the SEM micrographs after EPMA analysis in each spot. Table 3 presents the data of EPMA analysis.

High Resolution Transmission and Energy Filtered Electron microscopy (HRTEM and EFTEM). TEM and STEM measurements were performed using an image $C_s$ corrected FEI Titan 80-300 FEG-S/TEM system equipped with Gatan (Gatan Inc. Pleaseanton Calif.) Tridiem 866 energy filter. Measurements were taken in several modes, including: bright field, dark field, phase contrast and diffraction contrast and at 300 keV and 80 keV to make sure that no beam damage occurs during the measurement.

High Resolution Powder Synchrotron Diffractometry (HRPXRD). The measurements were conducted at a dedicated beamline ID22 of the European Synchrotron Radiation Facility (ESRF, Grenoble, France) at a wavelength of 0.4106 Å. This beam line uses a highly collimated and monochromatic beam to perform powder diffraction in the transmission setting. The beam passes through the sample and diffracts, to be collected on the opposite side by a set of 9 synchronized detectors, set 2.2° apart. The intensity of the diffractions is integrated over all detectors to produce high resolution diffraction patterns. Instrument calibration and wavelength refinement were performed with silicon standard NIST 640c.

For this analysis the samples were ground to a fine powder using an agate mortar and pestle. Powdered samples were loaded into borosilicate glass capillaries of diameter 0.7-1 mm. Isochronous annealing measurements were performed utilizing the X-ray diffractometer equipped with an in-situ heating system. Heating was done using a blower heater that blows hot air onto a very small area of the capillary, reaching a temperature resolution of 0.1° C. Heating locally ensures a precise temperature at the area where the X-ray beam collides with the sample and diffracts. Once the annealing time is up the blower heater was moved away while the capillary is spun around to allow quick and efficient cooling of the sample for a precise measurement. The samples were heated to a set of rising temperatures (200° C., 300° C., 400° C., 450° C., 500° C., 550° C., 600° C., and 650° C.), annealed at each temperature for 30 minutes and then cooled down prior to recording a diffraction pattern.

Figure 5:
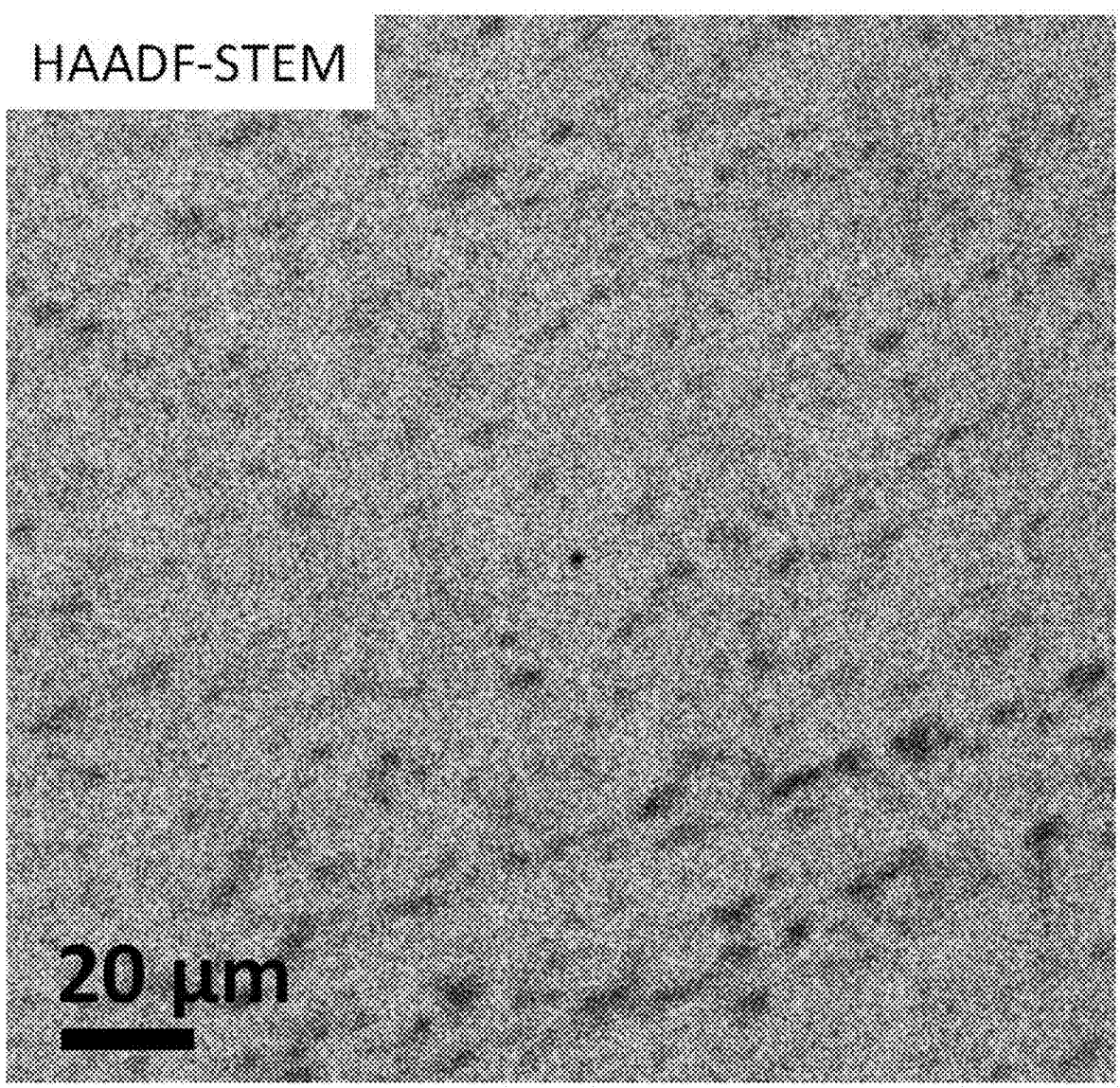
FIG. 5 presents a high angle annular dark-field scanning transmission electron microscope (HAADF-STEM) image of a section from a lens. This method provides z-contrast imaging. As can be seen the nanodomains appear darker than surrounding matrix confirming an average lower atomic number as expected for magnesium-rich particles in a calcium-rich matrix.

Rietveld Method. The measured X-ray powder diffraction profiles were subjected to Rietveld refinement within the GSAS-II program. The analysis allowed determination of the lattice parameters, unit cell volumes and weight fractions of all the phases present in the investigated samples at different temperatures. Extracted values and goodness of fit parameters are summarized in Table 1. Coherence length (nm) and micro-strain fluctuations along (104) plane of magnesium rich calcite nano-particles were derived applying the line profile analysis to (104) diffraction peak (FIG. 5).

Coupled Differential Scanning calorimetry-Thermogravimetric analysis (DSC-TGA) and Mass Spectrometry (MS). DSC/TGA measurements were performed using the LABSYS evo TGA/STA-EGA, and MS was performed using the Hiden QGA system. Measurements were taken with a reference crucible in an argon environment mixed with 20% air. Heating and cooling cycles were as follows: 1. Heating to 120° C. and holding for ~30 min to clear surface of sample from water molecules and contamination. 2. Heating to 650° C., at a rate of 5° min. 3. Cooling to ~40° C., at a rate of 5° min. and holding for ~30 min to cool the sample completely. 4. Heating to 650° C., at a rate of 5° min. 5. Cooling to ~40° C., at a rate of 5° per min. Two heating cycles were executed in order to isolate processes that occur during heating and are irreversible. These processes would be seen in the first heating cycle but not the second.

Photoemission Electron Microscopy (PEEM). Data for the component maps and spectra of FIGS. 8A and 8B were acquired using PEEM-3, on beamline 11.0.1.1 at the Advanced Light Source (Lawrence Berkeley National Laboratory) and processed using the Gilbert Group Macros in Igor Pro®. This type of mapping was previously done for Ca spectra. The spectral components used for the *Ophiocoma wendtii* lens map were: geologic dolomite (green) and *Ophiocoma wendtii* lens calcite (blue). The component maps were obtained enforcing positivity of the spectra, and allowing a ±0.45 eV shift of the entire spectra for best-fitting, and a background polynomial of second order. The spectra in FIG. 8B were obtained from averaging many single-pixels spectra, each obtained from a 20 nm pixel. These were 226 Mg-calcite-rich pixels, and 217 calcite pixels from the *Ophiocoma* lens, 170 and 101 for the sea urchin tooth, and 35×35=1225 pixels each from crystals of geologic dolomite and geologic calcite. All single-pixel spectra were first aligned in energy, then averaged, shifted in energy so that peak 1 was at 534 eV, and normalized so the intensities at the pre-edge and at the top of peaks 3 were 0 and 1, respectively, to obtain the spectra of FIG. 8B.

The geologic dolomite sample was a courtesy of Richard Slaughter, University of Wisconsin, Geology Museum. It originated from Black Rock, Ark. All samples for PEEM analysis were embedded in EpoFix (EMS, Hatfield, Pa.), and coated with 1 nm Pt in the area of interest and 40 nm Pt around it. The same samples were also used for EXAFS spectroscopies.

X-ray Absorption Fine Structure Spectroscopy (EXAFS). Calcium K-edge XAS was performed at three spots on one *Ophiocoma wendtii* lens at the beamline 10.3.2 of Advanced Light Source (Lawrence Berkeley National Laboratory). The spectra were alike, so they were averaged together for analysis. Other XAS spectra were taken on an Mg-rich spot on the sea-urchin tooth, and also on the geologic calcite sample mounted in grazing-exit mode to reduce over-absorption. The inventors used a simple model of the over-absorption effect to make the XANES spectra of the lens (taken at 45°) match in peak height those of calcite. The EXAFS spectrum of calcite showed a strong peak at 3.7 Å in the Fourier transform from Ca—Ca pairs (6 Ca neighbors at 4.05 Å), whereas the lens spectrum showed only a weak peak at that position. The inventors attempted to fit this peak with a mixture of Ca and Mg neighbors (using Artemis, from the IFEFFIT suite), but the addition of Mg atoms did not result in improved fits over a model with Ca only, therefore the contribution of Mg neighbors was not detectable. What makes the 3.7 Å peak weak in the *Ophiocoma wendtii* lens is not the presence of Mg atoms, but a large increase in the second moment of the distance distribution ($\Delta\sigma^2=0.05$ Å$^2$ vs 0.01 Å$^2$ for calcite), which could be due to lattice distortions caused by the differing sizes of Mg and Ca cations. The average Ca—O distance was the same as in calcite to within 0.02 Å, but the second moment of the distance distribution of Ca—O is greater by 0.001-0.007 Å$^2$. The inventors speculate that this dispersion in the Ca—O and Ca—(Ca, Mg) distances is related to the broadening of peak 2 observable in FIG. 8B.

Inductively Coupled Plasma Optical Emission Spectroscopy (ICP-OES). The system used was a Thermo Scientific Type iCAP6300 Duo ICP-OES. 3 mg of powdered sample were completely dissolved in 20 μl of the 6M HCl solution, added to DI water to complete 10 ml total for the analysis. During the experiment the sample is ionized by currents created by electromagnetic induction, using time-varying magnetic fields. These ions emit light at wavelengths characteristic of a particular element, which are detected and analyzed. The emitted intensity is further correlated to the concentration of the element in the sample. The results of the measurements are presented in table 2.

Sub Micron Scanning Synchrotron Diffractometry. Measurements were taken at the ID13 beamline, at the ESRF (Grenoble, France). A beam spot size used was approx. 180 nm×150 nm at FWHM, with a wavelength of 0.832109 Å. The calibration of the instrument was performed on a standard corundum (Al$_2$O$_3$) powder sample, before and after the measurements. Both the calibration measurements were found to be in an excellent agreement with each other (~0.01% difference in the subsequent d-spacing calculations). The calculated effective distance between the sample and the detector was 12.9216 cm. Scans were made over several areas of the DAP, which include the lenses, and the underlying mesh structure. The sample was scanned at several angles, and to find the angles of maximal reflection intensities (e.g. for d-spacing calculations) angular intervals of 0.05° were used.

In order to recognize the useful areas (differentiate between the sample and the background) for each scan a mask was automatically generated, based on the intensity and the sharpness of the signal around the central spot. The parameters of recognition were kept constant for each series of measurements. The masked areas were ignored for all subsequent calculations.

Sample preparation included embedding the DAPs in Epofix™ Cold-Setting Embedding Resin and polishing from one side, using AngstromLap lapping films of 30, 15, 9, 3 and 1 μm grades. Then 1 mm thick Marienfeld microscopy glass slides were cut to about 1 cm×1 cm squares, followed by drilling a 3 mm ⌀ hole in the center of each square. The polished sides of the epoxy-embedded samples were then glued onto the glass, so that the cross section of the DAP was positioned above the hole; in this way the X-ray beam did not pass through the glass, which would cause unnecessary absorption. Lastly, the opposite side of the epoxy was cut and polished to obtain samples with a thickness of circa 50 µm.

Microindentation experiments. Microindentation tests were carried out to measure the Young's modulus, hardness and fracture toughness of the brittlestar lenses as well as of [001]-cut geological calcite (geocalcite) for comparison. Geocalcite sample did not require additional preparation as the surface was fairly smooth and flat enough to directly perform indentation experiments. In case of the lenses, the samples were embedded in a resin and polished using a series of 400, 800, 1200, 2000 and 4000 grade sand papers. Finally, the samples were polished using a diamond paste with particle sizes in the range from 6 µm to 1 µm, to obtain a surface with minimal roughness. Poisson ratio of 0.31 was used for estimating the modulus. All the materials were indented using a standard CSM micro indenter with a load application of 100 mN. A standard Vickers indenter was used for measuring the properties of the material. The maximum applied load for indentation was chosen either by minimum detectable indentation impression visible through the microscope or a load that can make an indentation without resulting in catastrophic cracking of the sample surface.

The resulting experimentally obtained load-depth data were analysed using Matlab to determine the contact stiffness (S), reduced modulus (ER), and hardness (H) based on the well-established Oliver and Pharr method (42). The maximum displacement (hmax) at peak load (Pmax) and S were determined using the experimental data corresponding to the unloading curve. Specifically, S was defined as slope of the upper portion of the unloading curve during initial stages of unloading (43). The inventors used the standard relation from Oliver-Pharr method to relate the measured stiffness to the reduced modulus given by $$S = \frac{dP}{dh} = \frac{2}{\sqrt{\pi}} E_R \sqrt{A} \quad (1)$$

where A is the projected area of the contact between the indenter and the specimen. $E_R$ is the reduced modulus defined using known parameters based on the modulus ($E_i$) and Poisson's ratio ($v_i$) of the indenter. Thus, $$\frac{1}{E_R} = \frac{(1-v^2)}{E} + \frac{(1-v_i^2)}{E_i} \quad (2)$$

The material hardness, H, is defined a $$H = \frac{P_{max}}{A} \quad (3)$$

$$A = 26.43\, h_c^2 \quad (4)$$

where $h_c$ is contact depth.

In the fracture toughness calculations, the inventors used different elastic modulus and hardness values that correspond to geo-calcite and lenses, respectively. The estimated values of modulus and hardness of all the samples are reported in table 4. The estimated fracture toughness for geocalcite and biocalciteis reported in table 5.

Nano-computed Tomography (nanoCT). Nanotomoraphy datasets were obtained on ID16B of the European Synchrotron Radiation Facility (ESRF, Grenoble France) using phase contrast imaging based on holotomography. X-rays are focused down to a spot size of 50×50 nm$^2$ using two multilayer-coated Si mirrors in Kirkpatrick-Baez (KB) configuration under pink beam mode at 29.6 keV. The sample is positioned out of the focal plane in projection geometry. While rotating the sample, 2001 high-resolution images are collected by a PCO camera with a pixel size of 25 nm. The datasets were processed using phase retrieval algorithm based on in-house software using the GNU Octave programming environment as described previously. Following reconstruction and cropping, different sample regions were visualized to reveal the variable density layers in the lens as well as cracks propagating through the structure.

Time-of-Flight Secondary Ion Mass Spectrometry (ToF-SIMS). Measurements were performed utilizing LYRA3 FIB-SEM system (TESCAN, Czech Republic). Sample ionization is done by continual FIB/iFIB milling. Time of flight of the ions is measured with the TOFWERK detector (USA). Data visualized with the TESCAN 3D tomography tool. Sample was placed on standard aluminum holder with a conductive carbon tape. The LYRA microscope was used for this analysis. The Ga ions energy was 30 keV, ion beam current was 5 pA. ToF-SIMS analysis was performed in a positive ion mode. Analyzed area 1×1 µm$^2$.

Supplementary Text

Calculation of the Macroscopic Strain Induced by Homogeneous Distribution of Inclusions The strain field of a macroscopically homogeneous distribution of inclusions can be found as a sum of the macroscopic (average) strain, $\bar{\varepsilon}_{ij}$, and the internal strain, $\Delta\varepsilon(R)$, introduced by the internal displacement field with zero average gradient (47):

$$\varepsilon_{ij}(R) = \bar{\varepsilon}_{ij} + \Delta\varepsilon_{ij}(R) \quad (5)$$

An exact solution for internal strain can be found for a certain inclusion distribution with a given shape function, but this is not a subject of the present study.

The average strain in a stress-free solid that contains a homogeneous distribution of inclusions is just the stress-free strain of the inclusion phase, $\varepsilon_{kl}^0$, multiplied by its volume fraction, $\phi$:

$$\bar{\varepsilon}_{kl} = \varepsilon_{kl}^0 \cdot \phi \quad (6)$$

For the case of magnesium calcite matrix containing magnesium-rich coherent nanoparticles, the stress-free strain in the particles can be calculated relative to the unstressed matrix. For example, for the sample with average magnesium concentration (cation mole fraction, η) of 15.2 (1) mol %, magnesium concentration in the particles was found to be ~40 mol %, while in the matrix 13.3(1) mol %, that corresponds to the volume fraction of the particles $\phi \approx 0.08$. Lattice parameters of magnesium calcite (in Å) can be calculated using the relations (48):

$$a = 4.98964 - 0.4287733\eta + 0.07308\eta^2$$

$$c = 17.06728 - 2.0291349\eta - 0.02223\eta^2 \quad (7)$$

For the volume fraction of the particles $\phi$, the stress-free average strains can be calculated as:

$$\bar{\varepsilon}_{11} = \bar{\varepsilon}_{22} = \frac{a_p - a_m}{a_m}\phi, \bar{\varepsilon}_{33} = \frac{c_p - c_m}{c_m}\phi, \quad (8)$$

where the lattice parameters $a_m$ and $c_m$ correspond to the average magnesium concentration in the matrix, $a_p$ and $c_p$ are the lattice parameters of the nanoparticles. Using the values mentioned above one can find $\bar{\varepsilon}_{11}=\bar{\varepsilon}_{22}=-0.17\%$, $\bar{\varepsilon}_{33}=-0.26\%$ with average bulk contraction of ($\bar{\varepsilon}_{kk}$)/3=−0.20%. The average strain is accompanied by an internal coherent strain, since the lattice parameters of the nanoparticles and the matrix change with opposite sign (matrix contracts and nanoparticles expand).

Average elastic strains in the matrix can be evaluated using a Mori-Tanaka homogenization scheme. Considering a matrix with homogeneously distributed inclusions and uniform elastic constants throughout a specimen, one can evaluate average elastic strains in the matrix according to the expression:

$$\varepsilon_{ij}^m = -\phi(S_{ijmn}\varepsilon_{mn}^T - \varepsilon_{ij}^T) \quad (9)$$

where $S_{ijmn}$ is the Eshelby's tensor, and $\varepsilon_{mn}^T$ is the transformation strain of inclusions relative to the unstressed matrix. Using for $\varepsilon_{mn}^T$ the values of the lattice mismatch corresponding to Mg concentrations in the matrix 13.3 mol. %, and in the nanoparticles 40 mol. %, one can find:

$$\varepsilon_{11}^T = \varepsilon_{22}^T = \frac{a_p - a_m}{a_m} = -0.02158, \quad (10)$$

$$\varepsilon_{33}^T = \frac{c_p - c_m}{c_m} = -0.03249$$

For hexagonal crystals the Eshelby's tensor was calculated by Mura (49):

$$S_{ijmn} = \frac{1}{8\pi}C_{pqmn}(\bar{G}_{ipjq} + \bar{G}_{jpiq}) \quad (11)$$

where non-zero components of the $\bar{G}_{ijpq}$ are given below:

$$(12)$$

$$\bar{G}_{1111} = \bar{G}_{2222} = \frac{\pi}{2}\int_0^1 \Delta(1-x^2)\{[f(1-x^2)+h\rho^2 x^2]$$

$$[(3e+d)(1-x^2)+4f\rho^2 x^2]-g^2\rho^2 x^2(1-x^2)\}dx$$

$$\bar{G}_{1133} = \bar{G}_{2233} = 2\pi\int_0^1 \Delta\rho^2 x^2(1-x^2)\{[(d+e)(1-x^2)+2f\rho^2 x^2]$$

$$[f(1-x^2)+h\rho^2 x^2]-g^2\rho^2 x^2(1-x^2)\}dx$$

$$\bar{G}_{1212} = \frac{\pi}{2}\int_0^1 \Delta(1-x^2)^2\{g^2\rho^2 x^2 - (d-e)[f(1-x^2)+h\rho^2 x^2]\}dx$$

$$\bar{G}_{1313} = \bar{G}_{2323} = -2\pi\int_0^1 \Delta g\rho^2 x^2(1-x^2)[e(1-x^2)+f\rho^2 x^2]dx$$

$$\bar{G}_{3333} = 4\pi\int_0^1 \Delta\rho^2 x^2[d(1-x^2)+f\rho^2 x^2][e(1-x^2)+f\rho^2 x^2]dx$$

$$\bar{G}_{3311} = \bar{G}_{3322} = 2\pi\int_0^1 \Delta(1-x^2)[d(1-x^2)+f\rho^2 x^2][e(1-x^2)+f\rho^2 x^2]dx$$

where $$\Delta^{-1} = [e(1-x^2)+f\rho^2 x^2]\{[d(1-x^2)+$$
$$f\rho^2 x^2][f(1-x^2)+h\rho^2 x^2]-g^2\rho^2 x^2(1-x^2)\},$$

$\rho$ is the aspect ratio of the ellipsoidal inclusions, $d=C_{11}$, $e=(C_{11}-C_{12})/2$, $f=C_{44}$, $g=C_{13}+C_{44}$, $h=C_{33}$. Using elastic moduli of calcite (50): $C_{11}=150$ GPa, $C_{12}=58$ GPa, $C_{13}=54$ GPa, $C_{33}=85$ GPa, $C_{44}=35$ GPa, for spherical inclusions, $\rho=1$, from eqs. (11), (12) one can find the non-zero components of $\bar{G}_{ijpq}$: $\bar{G}_{1111}=0.057$, $\bar{G}_{1133}=0.094$, $\bar{G}_{3311}=0.116$, $\bar{G}_{3333}=0.094$, $\bar{G}_{1212}=-0.013$, $\bar{G}_{1313}=-0.02$, and the required components of the Eshelby's tensor: $S_{1111}=S_{2222}=0.537$, $S_{1122}=S_{2211}=0.024$, $S_{1133}=S_{2233}=0.056$, $S_{3311}=0.233$, $S_{3322}=0.076$, $S_{3333}=0.464$. Using equations (9) and transformation strains (10), one can find elastic strains in the matrix: $\varepsilon_{11}^m=\varepsilon_{22}^m=-6.1\cdot 10^{-4}$, $\varepsilon_{33}^m=\mathbf{-8.6\cdot 10^{-4}}$, with compressive hydrostatic strain within the matrix $\varepsilon_H^m=\mathbf{-7\cdot 10^{-4}}$; corresponding compressive stresses in the matrix:

$$\sigma_{11}^m = \sigma_{22}^m = (C_{11}+C_{12})\varepsilon_{11}^m + C_{13}\varepsilon_{33}^m \approx -180 \text{ MPa}$$

$$\sigma_{33}^m = 2C_{13}\varepsilon_{11}^m + C_{33}\varepsilon_{33}^m \approx -140 \text{ MPa} \quad (13)$$

and the hydrostatic compressive stress within the matrix $\sigma_H \approx -170$ MPa. These values can be slightly different for elongated inclusions. For example, for $\rho=4$ and the same elastic constants, $\sigma_{11}^m = \sigma_{22}^m = 205$ MPa, $\sigma_{33}^m = 53$ MPa The Critical Size for Coherency Loss The energy of a spherical coherent inclusion of phase α in the matrix of phase β is the sum of the elastic and surface energies:

$$\Delta E_{inclusion} = 4\pi R^2 \gamma_{coh} + 4/3\pi R^3 \varpi \quad (14)$$

where $\gamma_{coh}$ is the coherent interface energy, $\varpi$ is the mean elastic energy per unit volume caused by the coherent inclusion (or distribution of coherent α-inclusions in the β-matrix).

The elastic energy per unit volume of the matrix caused by homogeneous distribution of similar coherent nanoparticles can be estimated using the following equation (49):

$$\varpi = -\tfrac{1}{2}\sigma_{ij}^P \varepsilon_{ij}^T \phi \quad (15)$$

where $$\sigma_{11}^P = \sigma_{22}^P(C_{11}+C_{12})\varepsilon_{11}^P + C_{13}\varepsilon_{33}^P$$

$$\sigma_{33}^P = 2C_{13}\varepsilon_{11}^P + C_{33}\varepsilon_{33}^P \quad (16)$$

are tensile stresses within the nanoparticles and $\varepsilon_{ij}^P$ are the elastic strains within the nanoparticles:

$$\varepsilon_{ij}^P = \varepsilon_{ij}^T \phi - \varepsilon_{ij}^T = \varepsilon_{ij}^T(\phi - 1). \quad (17)$$

For the magnitudes of parameters found above, $\varepsilon_{11}^P = \varepsilon_2^P \approx 0.02$, $\varepsilon_{33}^P \approx 0.03$ with tensile hydrostatic strain within the nanoparticles $\varepsilon_H^P \approx 0.023$, tensile stresses $\sigma_{11}^P = \sigma_{22}^P \approx 5.74$ Gpa, $\sigma_{33}^P \approx 4.68$ Gpa and $\varpi \approx 16$ MJ/m$^3$.

When a coherent inclusion reaches a certain critical size, the elastic energy becomes large enough to induce relaxation processes such as formation of misfit dislocations, the coherency is lost, and the elastic energy transforms to a new surface energy of incoherent inclusion/matrix interface with the energy $\gamma_{incoh}$. The critical size can be determined from the equation:

$$\overline{R} = \frac{3(\gamma_{incoh} - \gamma_{coh})}{\omega} \quad (18)$$

In order to evaluate this value, the inventors need to know the interface energies (coherent and incoherent). If the inventors assume reasonable values $\gamma_{incoh}=(0.1\div0.2)$ J/m² and $\gamma_{coh} \ll \gamma_{incoh}$ then $$\overline{R} \approx \frac{3\gamma_{incoh}}{\omega} \approx (19 \div 38) \text{ nm}. \quad (19)$$

This result corresponds well to the nanoparticles sizes observed during thermal treatment, when coherency is lost (TEM, XRD results).

Additional Information on the XANES-PEEM Experiment.

Figure 8C:
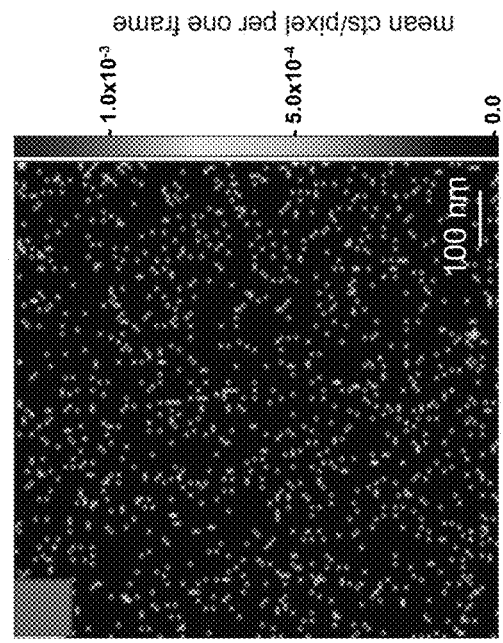
FIGS. 8A-C present pictures of photoemission electron microscopy (PEEM) and time-of-fight secondary ion mass spectrometry (ToF-SIMS) mapping; PEEM component map with 20 nm pixels displaying the spatial distribution of the two phases in a brittlestar lens: low magnesium calcite (blue) and high magnesium calcite (green). Magnesium-rich calcite nanoparticles are only resolved as mixed with calcite (blue+green=cyan) (FIG. 8A); Oxygen XANES spectra show that lens calcite is similar to geologic calcite, as shown by aligned peaks 1-4 (vertical lines, bottom). Lens Mg-calcite peak 2 is intermediate between calcite and dolomite (FIG. 8B); and $Mg^+$ distribution map acquired via ToF-SIMS analysis within a single lens (FIG. 8C). The map is 128×128 pixels, with 8 nm/pixel.
Figure 8B:
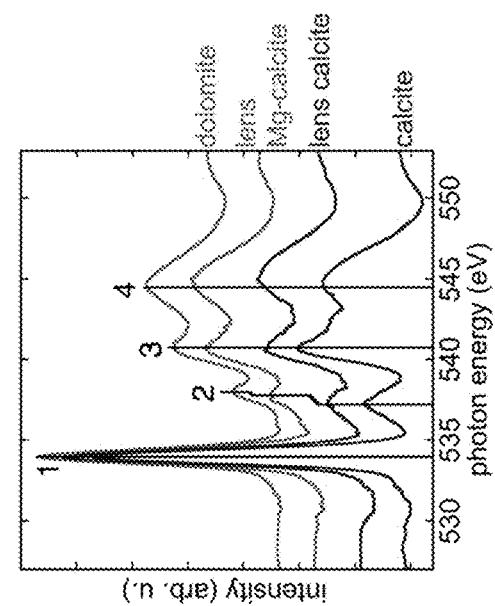
Figure 8A:
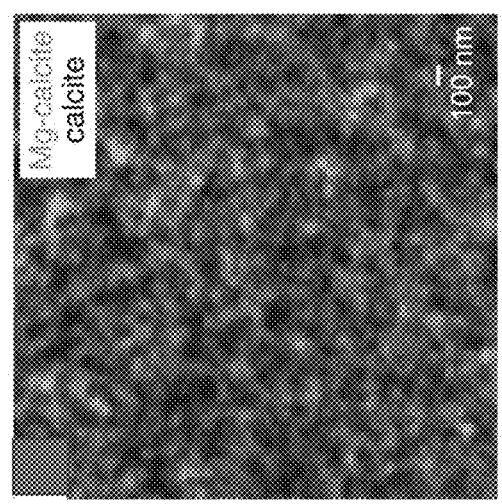

In FIG. 8A the inventors present data obtained with PEEM demonstrating that Mg-calcite nanoparticles are interspersed and co-oriented with calcite in the *Ophiocoma wendtii* lens, but are spectroscopically distinct (FIG. 8B), thus their crystal and electronic structure differs from calcite. Notice that the peak 2 position in FIG. 8B for the *Ophiocoma wendtii* lens is intermediate between those of geologic calcite and dolomite. The precise peak positions are shown in table 3. This peak shift with Mg concentration in O spectra is observed here for the first time, but is consistent with Raman peak shifting with Mg concentration. This observation enables us to use the PEEM data to estimate the concentration of Mg in the Mg-rich calcite nanoparticles in the *Ophiocoma wendtii* lens, because the PEEM experiment only probes the next neighboring atoms to oxygen, and is different in the lens calcite matrix and the lens Mg-rich calcite nanoparticles (FIG. 8B). Specifically, the peak labeled 2 is due to O—Ca bonds or O—Mg, and disappears in simulated spectra of an artificial calcite structure in which all Ca atoms are replaced by Be.

Calculations of the Lattice Parameters in Accordance to Magnesium Content for High and Low Magnesium Calcite.

The relative concentration of magnesium, is calculated as following:

$$\eta_{Mg} = \frac{c_{Mg}}{c_{Ca} + c_{Mg}}, \quad (20)$$

where $C_{Mg}$ and $C_{Ca}$ are the molar fractions of Mg and Ca respectively.

The structural parameters of calcite containing certain amounts of magnesium could be calculated using Eq. 7.

Calculations of the Magnesium Concentration Based on the Results of ICP-OES Analysis.

Molecular weights used (numbers are given after subtracting reference data):

$$Mw_{Ca} = 40.078 \frac{g}{mol}$$

$$Mw_{Mg} = 24.305 \frac{g}{mol}$$

Number of mols was calculated using:

$$\# \text{ mol} = \frac{wt[mg]}{Mw\left[\frac{g}{mol}\right] \cdot 1000\left[\frac{mg}{g}\right]}$$

Number of $CO_3$ mols was calculated using: $mol_{CO_3}=4\cdot(mol_{Ca}+mol_{Mg})$ The atomic and mol percents of magnesium were calculated from the following expressions:

$$at \%_{Mg} = \frac{mol_{Mg}}{mol_{Ca} + mol_{Mg} + mol_{CO_3}} \quad (21)$$

$$mol \%_{Mg} = \frac{mol_{Mg}}{mol_{Ca} + mol_{Mg}}$$

Detailed results of the ICP-OES analysis and calculated values of magnesium concentration presented in table 2.

Additional Information on Mechanical Testing.

In this section, the inventors present a model for calculating the toughening expected as a consequence of the two observed phenomena, i.e. of (i) matrix pre-compression, (ii) crack deflection at the layer-layer interface. In the case of a matrix pre-compression $\sigma_0$ ($\sigma_0<0$), the local stress-intensity factor at the tip of a crack will be given by $K_{IC}^{(l)}=(\sigma_a+\sigma_0)\sqrt{\pi a}$ and the crack will propagate when $K_{IC}^{(l)}=K_{IC}=\sigma_C\sqrt{\pi a}$, where $K_{IC}$ is the fracture toughness, $\sigma_a$ is the applied stress, $\sigma_C$ is the fracture strength without pre-compression. The last condition is equivalent to writing $K_I=\sigma_a\sqrt{\pi a}=K_{IC}^{(\sigma_0)}=K_{IC}-\sigma_0\sqrt{\pi a}=K_{IC}(1-\sigma_0/\sigma_c)$, where $K_I$ is the (nominal) stress intensity factor and thus $K_{IC}^{(\sigma_0)}$ can be seen as the effective fracture toughness. Similarly, the effective material tensile strength is $\sigma_C^{(\sigma_0)}=\sigma_C-\sigma_0$.

One can estimate the fracture strength from the values of measured fracture toughness $\sigma_C^{(\sigma_0)}=K_{IC}/\sqrt{\pi a}$, where $\overline{a}$ is effective initial crack length. For fracture toughness of the brittlestar lenses, $K_{IC}=0.42$ MPa·m$^{1/2}$ and the effective initial crack length $\overline{a}=(500\div750)$ nm one can obtain $\sigma_C^{(\sigma_0)}=(270\div335)$ MPa. The inventors estimated the fracture toughness of the brittlestar lenses to be 2.21 times than that of geocalcite (obtained via the indentation tests). If this difference is provided by internal compressive stress $\sigma_0$ only, than, taking into account that $\sigma_C^{(\sigma_0)}=\sigma_C=\sigma_C-\sigma_0$, one can find $\sigma_0=-(1.21/2.21)\sigma_C^{(\sigma_0)}=-0.55\sigma_C^{(\sigma_0)}=-(150\div180)$ MPa, that correlates very well with the estimated value of compressive hydrostatic stress in the matrix caused by coherent nanoparticles (~−170 MPa).

In the case of crack deflection at the layer-layer interface the energy spent during crack propagation becomes higher due to an increment $\sigma_=$ in the crack length along the interface. Denoting with $G_C$ the (nominal) fracture energy (per unit area), the energy equivalence implies: $G_C(a+\sigma_=)b=G_C^{(a=)}ab$, where $G_C^{(a=)}$ is the effective fracture energy of the multilayered structure (and b is a width). From the classical correlation between fracture energy and toughness, i.e., $G_C=K_{IC}^2/E$ the inventors finally derive: $K_{IC}^{(a=)}=K_{IC}\sqrt{(1+a_=/a)}$. Combining the two mechanisms the inventors find:

$$K_{IC}^* = K_{IC}\left(1 - \frac{\sigma_0}{\sigma_C}\right)\sqrt{1 + \frac{a_=}{a}}.$$

Considering the nominal crack length across a layer equal to its thickness t, from microscope observations the inventors estimate $a=t\approx 250$ nm and $a_=(250\div 500)$ nm as the mean crack deflection per single layer, thus $K_{IC}^{(a=)}=K_{IC}\sqrt{(1+a_-/a)}=(1.4\div 1.7)K_{IC}$. Internal compressive stress providing the measured ratio $K^*_{IC}/K_{IC}=2.21$ can be now estimated as $\sigma_0=-(0.22\div 0.36)\sigma_C^{(\infty)}=-(60\div 120)$ MPa. It should be noted that these estimations are based on the assumption about the initial crack lengths in the brittlestar lenses and in the geocalcite to be the same, which may not always be the case.

Example 1

Characterization of the Micro- and Nanostructure of Arm Plates of Brittlestars

The inventor's studies of the atomic- and nanostructure of the dorsal arm plates of the brittlestar *Ophiocoma wendtii* disclose the presence of coherent nanoprecipitates that induce comprehensive compressive stresses on the host single crystal, akin to the Guinier-Preston zones known in classical metallurgy. The arm plates of these brittlestars are covered by hundreds of calcite lenses, each several tens of microns in size. The lenses were found to be part of a large single crystal, with microlenses that focus light onto photoreceptor nerve bundles positioned beneath them. Each lens is aligned along its optical axis parallel to the c-axis of calcite. This orientation minimizes the effect of the birefringence of calcite, preventing double vision.

Figure 2A:
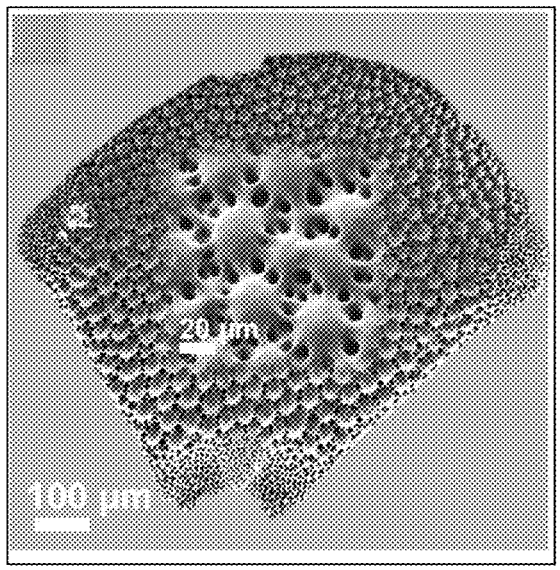
Figure 3A:
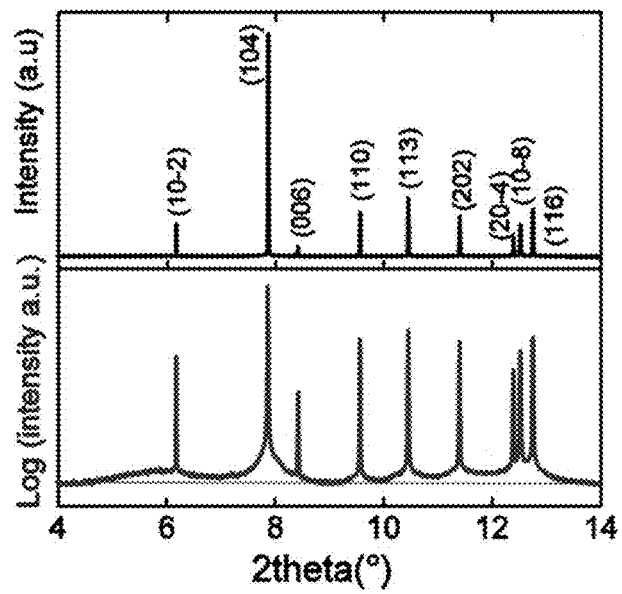
FIGS. 3A-C present graphs of high-resolution X-ray diffraction (XRD) characterization: full diffractogram of a powdered dorsal arm plates sample at room temperature collected at a wavelength of 0.4106 Å (FIG. 3A); linear intensity (top) and logarithmic intensity scales (bottom); zoom-in on the (104) diffraction peak comparing linear (full line) and logarithmic (dotted line) intensity scales, and revealing the presence of nanodomains at the base of the diffraction peak (FIG. 3B); evolution of the (104) diffraction peak with heat treatments (FIG. 3C); After annealing at 400° C. a distinct broad diffraction peak appears owing to the heat-induced loss of nanoprecipitate coherence.
Figure 3B:
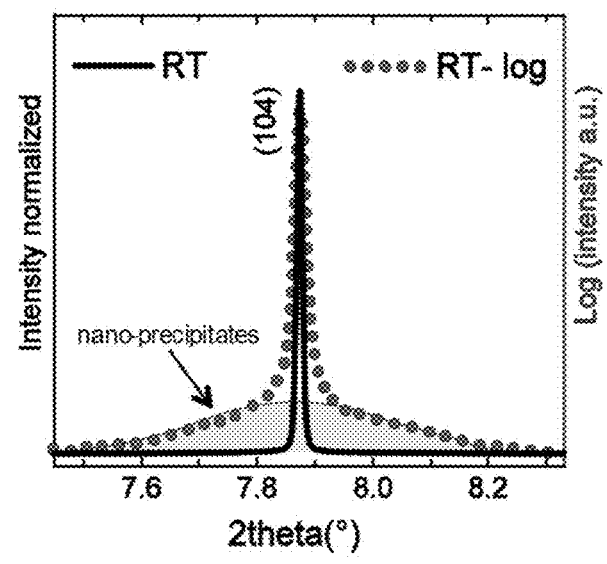

Lenses (FIG. 2A) have curved surfaces that focus light on the presumed photoreceptor. Examination of the dorsal arm plates by high-resolution powder X-ray diffraction (HRPXRD) (FIG. 3A) revealed the structure of calcite only. After Rietveld refinement analysis the inventors obtained lattice parameters smaller than that of pure calcite, but very close in size to those expected from magnesium substitution: $a=4.92577(3)$ Å and $c=16.76897(6)$ Å (Table 1).

TABLE 1

Extracted crystal lattice parameters, weight phase fractions at different temperatures and goodness of fit parameters.

| Temp., °C | Phase name | Phase fraction, wt % | a, b- parameters, Å (ESDs) | c- parameter, Å (SD) | GOF | wR, % |
|---|---|---|---|---|---|---|
| RT | low-Mg CaCO$_3$ | 100 | 4.92577(3) | 16.76897(6) | 3.95 | 13.64 |
| 200 | low-Mg CaCO$_3$ | 100 | 4.9263(6) | 16.7769(1) | 6.21 | 21.31 |
| 300 | low-Mg CaCO$_3$ | 100 | 4.9289(13) | 16.8332(3) | 4.98 | 17.59 |
| 400 | low-Mg CaCO$_3$ | 91.5 | 4.9488(44) | 16.918(1) | 2.33 | 8.06 |
|  | high-Mg CaCO$_3$ | 8.5 | 4.837(1) | 16.155(2) |  |  |
| 450 | low-Mg CaCO$_3$ | 89.4 | 4.9549(46) | 16.9420(11) | 3.27 | 11.42 |
|  | high-Mg CaCO$_3$ | 10.6 | 4.838(1) | 16.1614(3) |  |  |
| 500 | low-Mg CaCO$_3$ | 90.5 | 4.9561(42) | 16.943(1) | 3.35 | 11.89 |
|  | high-Mg CaCO$_3$ | 9.5 | 4.838(12) | 16.144(3) |  |  |
| 550 | low-Mg CaCO$_3$ | 91.1 | 4.9566(42) | 16.9409(99) | 3.54 | 12.71 |
|  | high-Mg CaCO$_3$ | 8.4 | 4.837(12) | 16.1378(31) |  |  |
|  | MgO | 0.5 | 4.2169(2) | 4.2169(17) |  |  |
| 600 | low-Mg CaCO$_3$ | 90.5 | 4.957(4) | 16.9379(11) | 3.73 | 13.73 |
|  | high-Mg CaCO$_3$ | 8 | 4.838(2) | 16.138(4) |  |  |
|  | MgO | 1.5 | 4.2169(17) | 4.2169(2) |  |  |
| 650 | low-Mg CaCO$_3$ | 73.3 | 4.9859(27) | 17.0957(5) | 3.33 | 12.48 |
|  | high-Mg CaCO$_3$ | 21 | 4.9552(58) | 16.8981(14) |  |  |
|  | MgO | 5.7 | 4.2169(17) | 4.2169(17) |  |  |

Measurement of the magnesium content and other impurities by means of inductively coupled plasma optical emission spectroscopy (ICP-OES), electron probe micro analysis (EPMA), and energy dispersive spectroscopy revealed an average concentration, $\eta_{avg}$, of about 15.2±0.1 mol %, where $\eta=Mg/(Ca+Mg)$ mol % (Tables 2 and 3). Magnesium readily substitutes for calcium in the calcite structure and causes the lattice parameters to shrink.

TABLE 2

ICP-OES Results

| Exp. # | Ca [mg] | Mg [mg] | Ca [# mol] | Mg [# mol] | CO$_3$ | Calculated mol % Mg(SD) |
|---|---|---|---|---|---|---|
| 1 (per 10 ml) | 0.599513 | 0.066245 | 1.49E-05 | 2.72E-06 | 7.07E-05 | 15.41(9) |
| 2 (per 20 ml) | 1.216666 | 0.131140 | 3.04E-05 | 5.40E-06 | 1.43E-04 | 15.09(11) |
| 3 (per 20 ml) | 0.925466 | 0.099460 | 2.31E-05 | 4.09E-06 | 1.09E-04 | 15.05(7) |
| Average over 3 experiments |  |  |  |  |  | 15.2(1) |

TABLE 3

Electron Probe Micro-Analysis Results

| Sample | EPMA Mg ± SD (elemental wt %) | EPMA Mg ± SD (Mg at % cation per calcite CO$_3$ group equivalent to η = Mg/(Ca + Mg) mol %)) | PEEM XANES spectra peak 2 position ± SD (eV) |
|---|---|---|---|
| Chihuahua Calcite | 0.02 ± 0.05 wt % | 0 ± 0 at % | 537.35 ± 0.05 eV |
| Ophiocoma Lens low Mg-calcite | — | — | 537.30 ± 0.05 eV |
| Ophiocoma Lens averaged | 3.2 ± 0.3 wt % | 13 ± 1 at % | 537.60 ± 0.05 eV |
| Ophiocoma Lens high Mg-calcite | — | — | 537.80 ± 0.05 eV |
| Black Rock Dolomite | 11.7 ± 0.2 wt % | 45 ± 3 at % | 537.96 ± 0.05 eV |

Figure 2B:
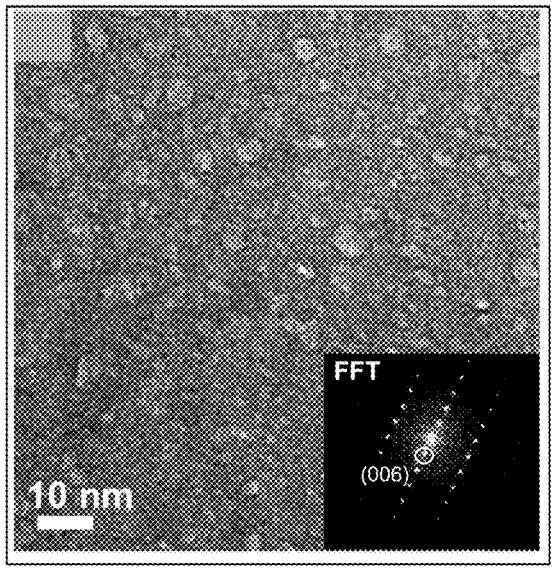
Figure 4A:
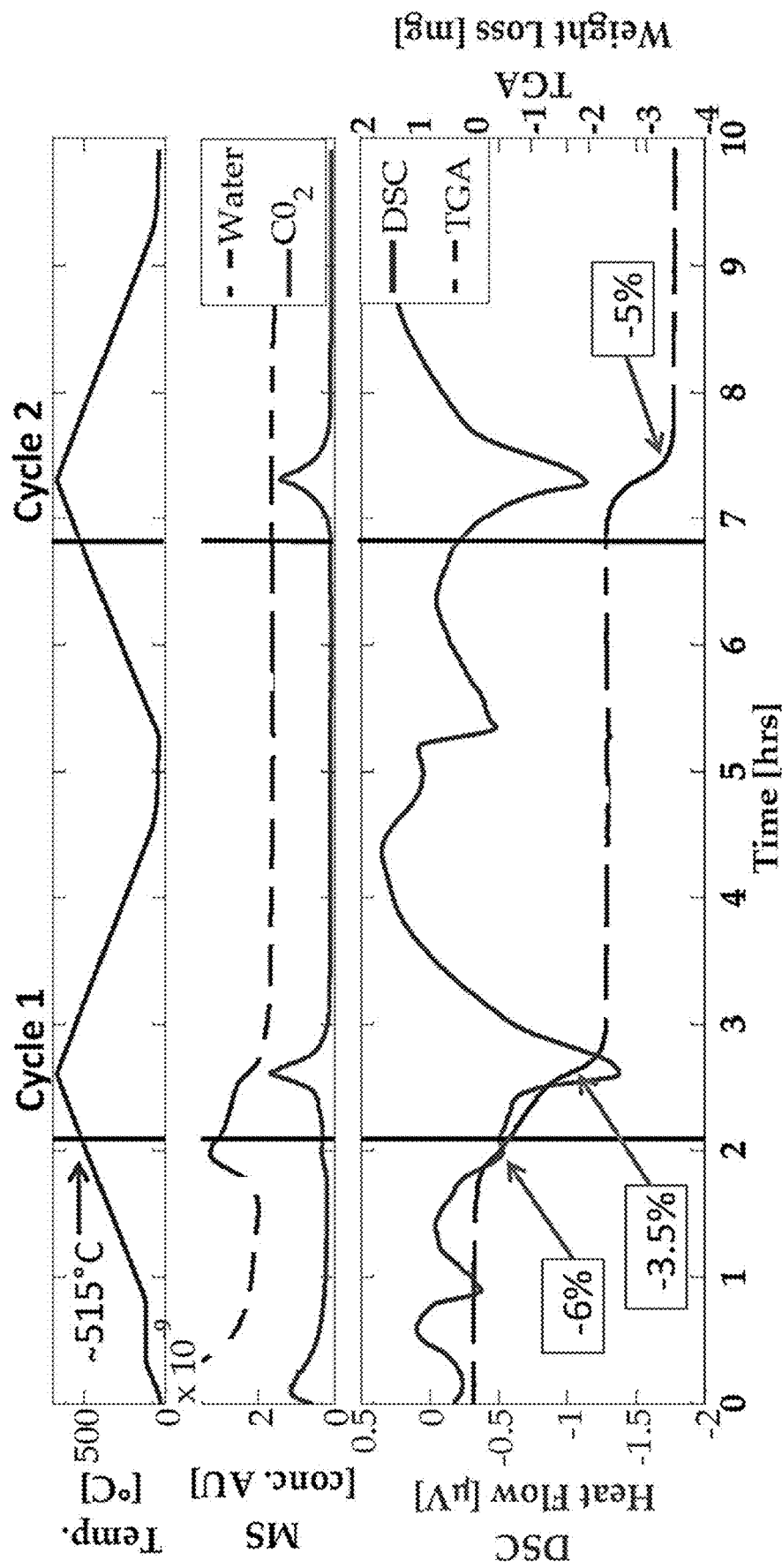
FIGS. 4A-B present graphs of the results of coupled Differential Scanning calorimetry (DSC)-Thermogravimetric analysis (TGA) and Mass Spectrometry (MS) measurements for water and $CO_2$: complete measurement done in two heating cycles (FIG. 4A), vertical lines are at the position of 515° C., where a small peak can be seen in the DSC results. Percent numbers marked denote the amount of material lost during heating in TGA measurement. Zoom in on the mentioned peak at 515° C. The peak although detectable, is far too small to indicate an amorphous-to-crystalline transformation (FIG. 4B)
Figure 4B:
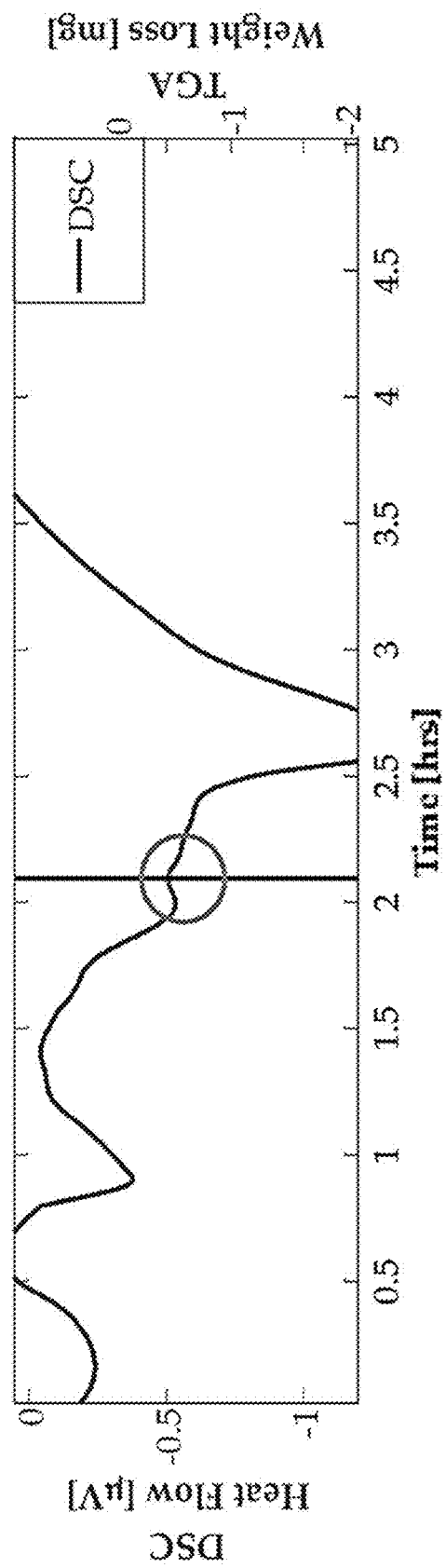

Typical bright-field aberration corrected HRTEM images can be seen in FIGS. 2B and C. Even though the entire dorsal arm plate has been identified as a calcite single crystal, an ensemble of nanodomains can be observed within the matrix (FIGS. 2B and C). These nanodomains appear brighter in bright-field mode, indicating their relatively lower electron density. Despite the presence of these domains, Fast Fourier transform (FFT) of the entire image on TEM yields a single crystal pattern (FIGS. 2B and C insets). On the likely assumption that the *Ophiocoma wendtii* lenses are formed via transient amorphous precursors as are other echinoderm ossicles the inventors explored the possibility that these nanodomains consist of residual amorphous material. This was ruled out, however, by differential scanning calorimetry coupled with thermal gravimetric analysis, which did not show any of the exothermal peaks (FIGS. 4A-B) that are observed when amorphous calcium carbonate is heated and crystallized.

Figure 2C:
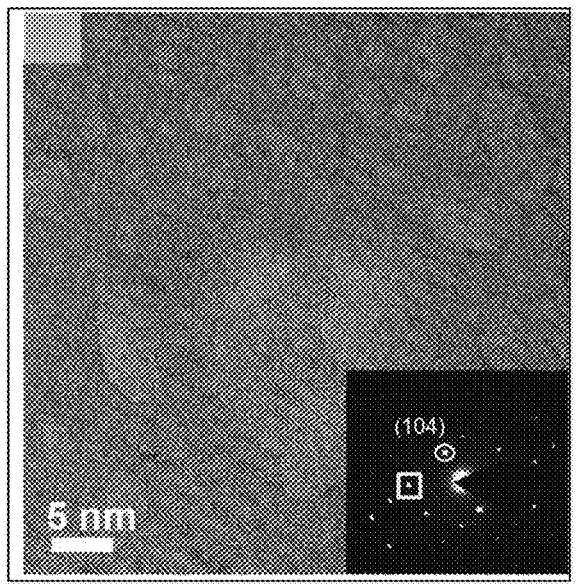
Figure 2D:
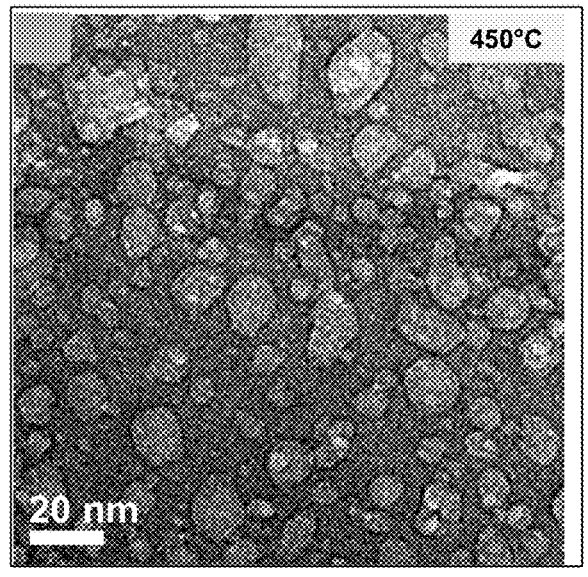
Figure 3C:
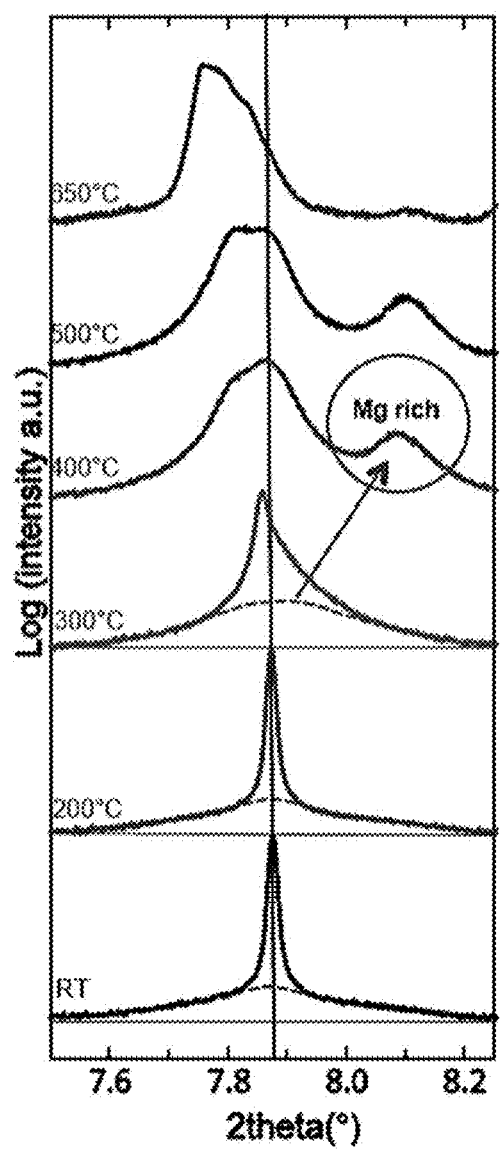

The inventors further subjected powdered dorsal arm plates, while it was undergoing HRPXRD, to isochronous heating in situ at 30-min intervals at various temperatures up to 650° C. Upon heating the diffraction peaks showed a large but gradual shift to lower diffraction angles (FIG. 3C) opposite in sign to the shift observed for other annealed biogenic calcites. After treatment at 650° C. the lens's lattice reverted to a calcite-like lattice with a median magnesium concentration of about 0.4 mol %. After annealing at 400° C. a new calcite nanoscale phase appeared, with lattice parameters a=4.837(1) Å and c=16.155(2) Å (FIG. 3C and Table 1). The emergence of this nanophase was accompanied by a strong shift in peak position of the main calcite matrix. The lattice parameters of the calcite nanophase corresponded to a magnesium-rich phase with $η_p$~40 mol %. This nanophase is identical to the nanoparticles seen in the TEM imaging (FIGS. 2B-D) and their brighter appearance in bright-field TEM is explained by the presence of magnesium-rich calcite. Moreover, upon high-angle annular dark field (HAADF) scanning TEM, which provides z-contrast imaging, these nanodomains appear darker than the matrix, confirming a lower average atomic number, as expected for magnesium-rich particles in a calcium-rich matrix (FIG. 5).

Figure 6A:
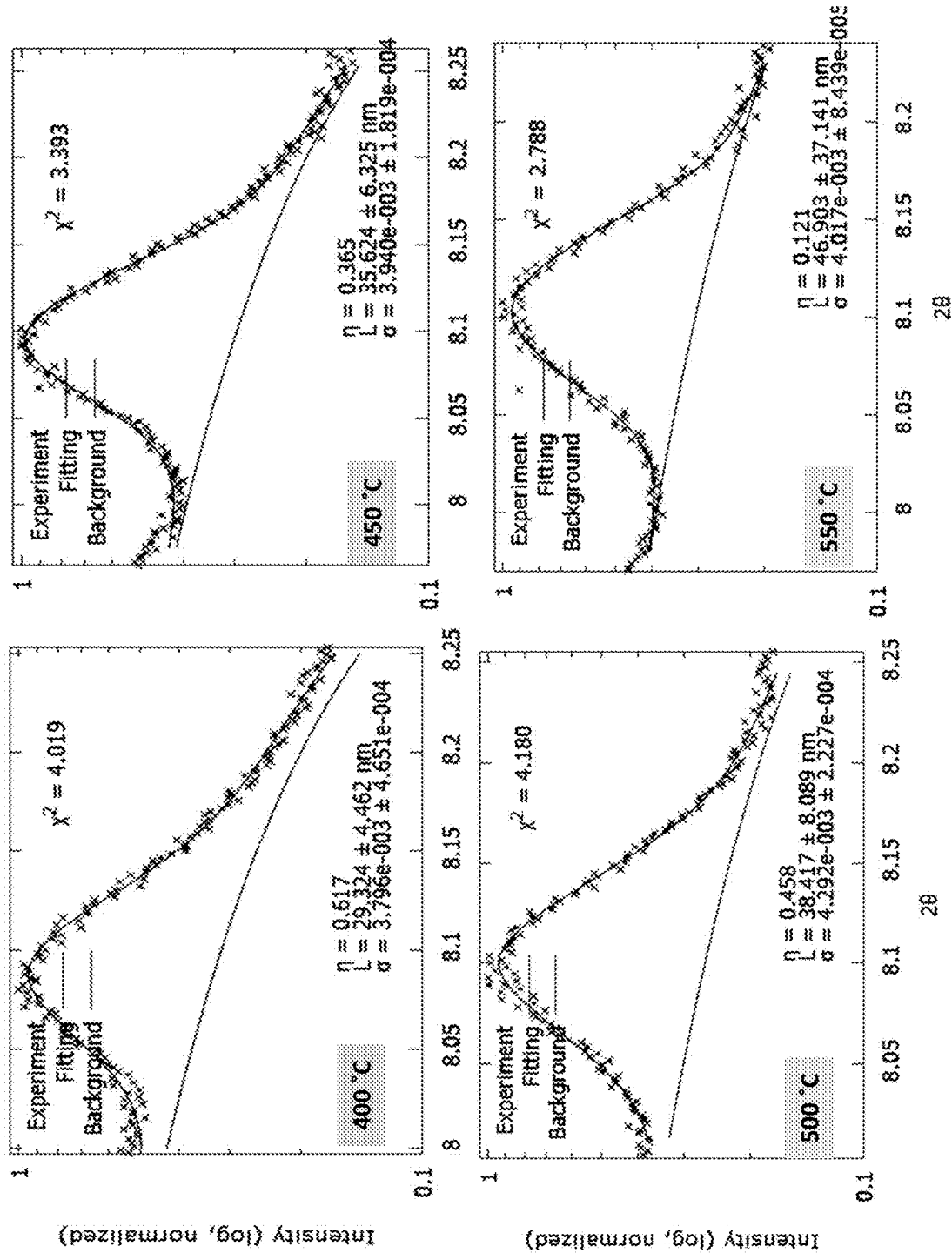
FIGS. 6A-B present XRD line profile analysis of the (104) plane of the magnesium-rich phase; microstructural evolution of the (104) plane in calcite nanodomains subjected to thermal annealing (FIG. 6A). In order to determine the Lorentzian (crystallite size) and Gaussian (micro-strain fluctuations) contributions on a single diffraction peak the inventors applied the Voigt function approach. The profile fitting was performed utilizing the Gnuplot 5.0 interface; obtained results demonstrate an increase in crystallite size upon annealing accompanied by the increase in the averaged micro-strain fluctuations (FIG. 6B).
Figure 6B:
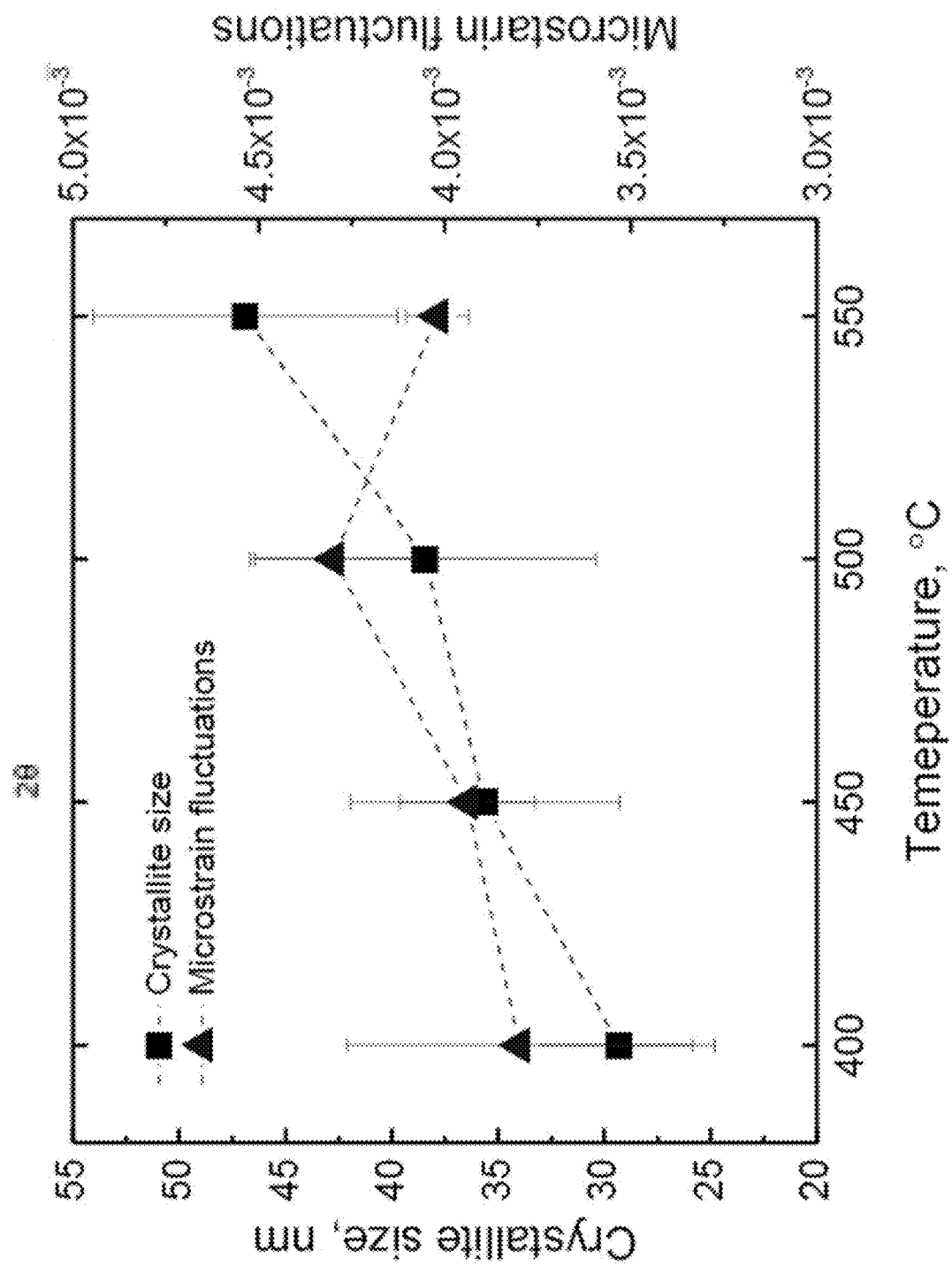
Figure 7A:
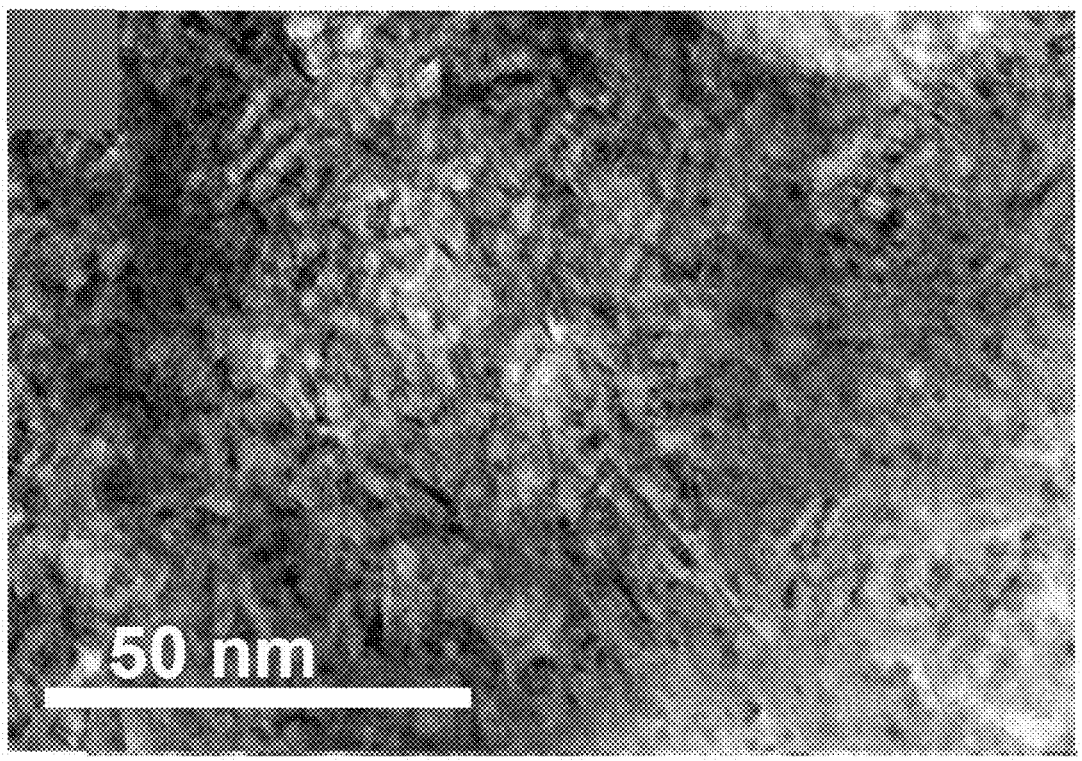
FIGS. 7A-B present images of energy filtered TEM.
Figure 7B:
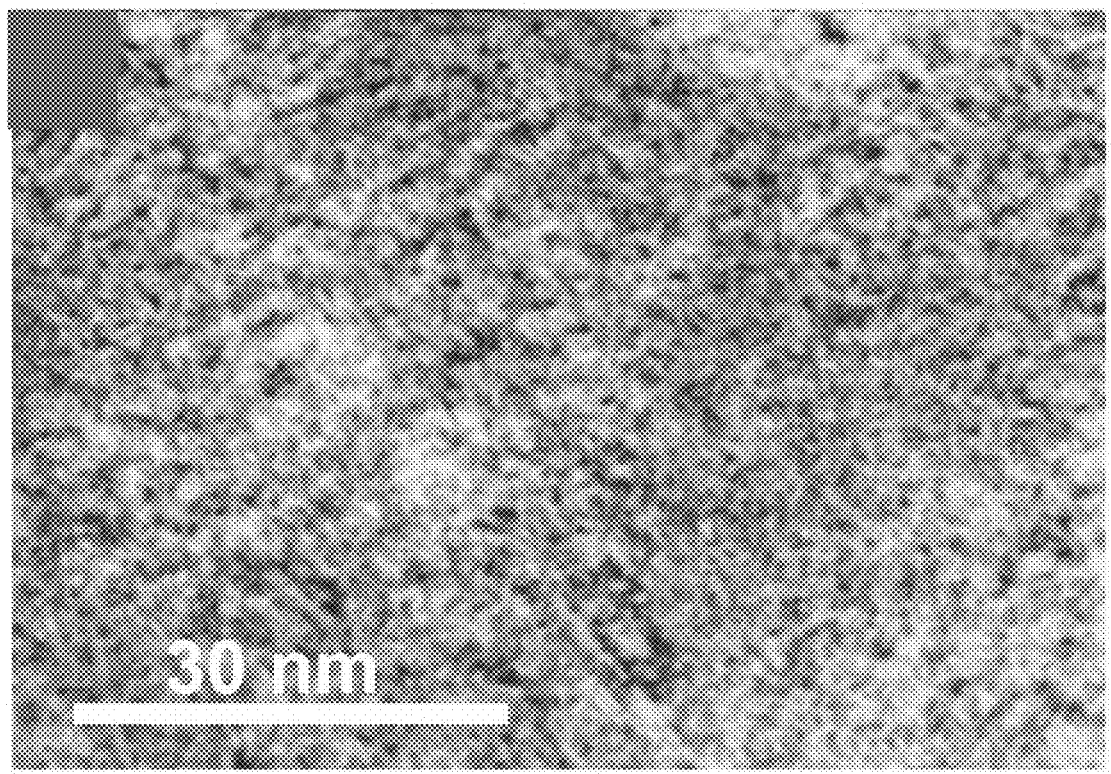

Samples were heated in situ within the TEM which induced crystal growth. The nanoparticles grew from several nanometers to about 20-40 nm at 450° C. (FIG. 2D). Line-profile analysis of the powder XRD corroborated this finding (FIGS. 6A-B). Magnesium energy-filtered TEM of the heated sample confirmed that the domains, were magnesium-rich when compared to the matrix, (FIGS. 7A-B). Proof that the domains are rich in magnesium was obtained, prior to heat treatment, by X-ray absorption near-edge structure spectroscopy and photoemission electron microscopy (XANES-PEEM) (FIGS. 8A, B) and by 2D time-of-fight secondary ion mass spectrometry (ToF-SIMS) from a single lens (FIG. 8C). Both assessments revealed that the dispersed particles are richer in magnesium than the matrix. Component mapping with PEEM was possible because the nanodomains and the lens matrix are spectroscopically distinct as shown in XANES spectra (FIG. 8B and Table 3).

Figure 9:
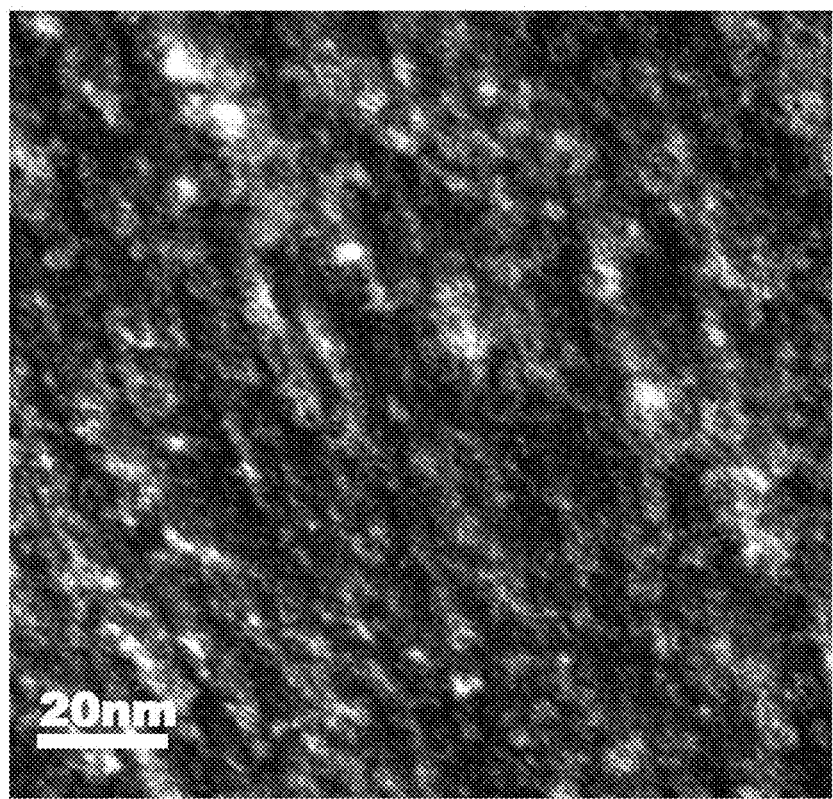
FIG. 9 presents a dark field TEM image of a sample of the lens after heating at 500° C. demonstrating absence of strain fringes as seen on the same sample (FIG. 2E) before the heat treatment.

As the calcite nanodomains are rich in magnesium, and the lattice parameters of these nanoparticles are considerably smaller than those of the calcite matrix, it would seem that at least part of the large shifts in diffraction peaks upon heating to larger lattice parameters is indicative of compressive strains in the crystal matrix. This is probably a result of coherence between the nanodomains and the matrix. The presence of local strain fields is confirmed by dark-field TEM imaging, where strain fringes are seen (FIG. 2E), however they completely disappear after heat treatment as the strains are relaxed (FIG. 9).

Figure 10A:
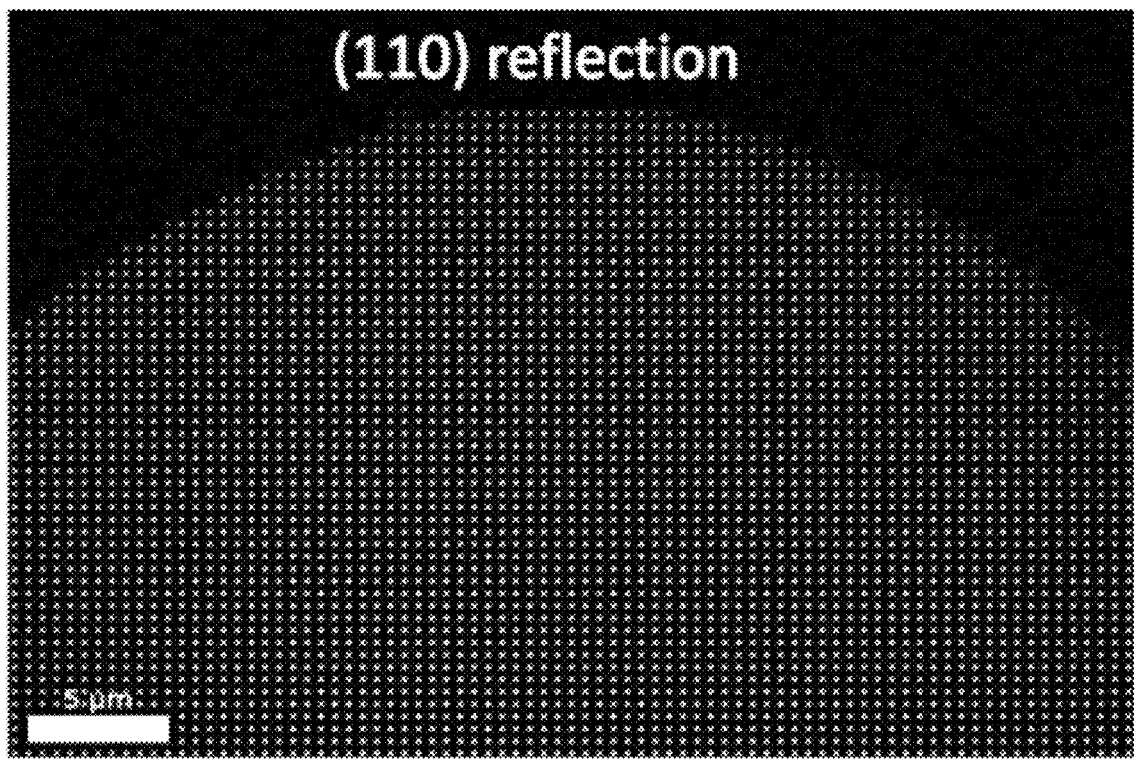
FIGS. 10A-B present scanning sub-micron synchrotron diffraction results for (110) reflection: detailed analysis of a single lens using the (110) reflection (FIG. 10A); the area of the lens was scanned around the angle of maximum intensity: −7.85°. Although the diffraction spots vary in intensity, they are all at exactly the same position in the diffraction pattern. This finding indicates the sample's single-crystalline nature. 2-D rocking curve for (110) reflection (FIG. 10B). Rocking curve is calculated from the single lens scan, showing a very sharp peak with a FWHM of only 0.1°.
Figure 10B:
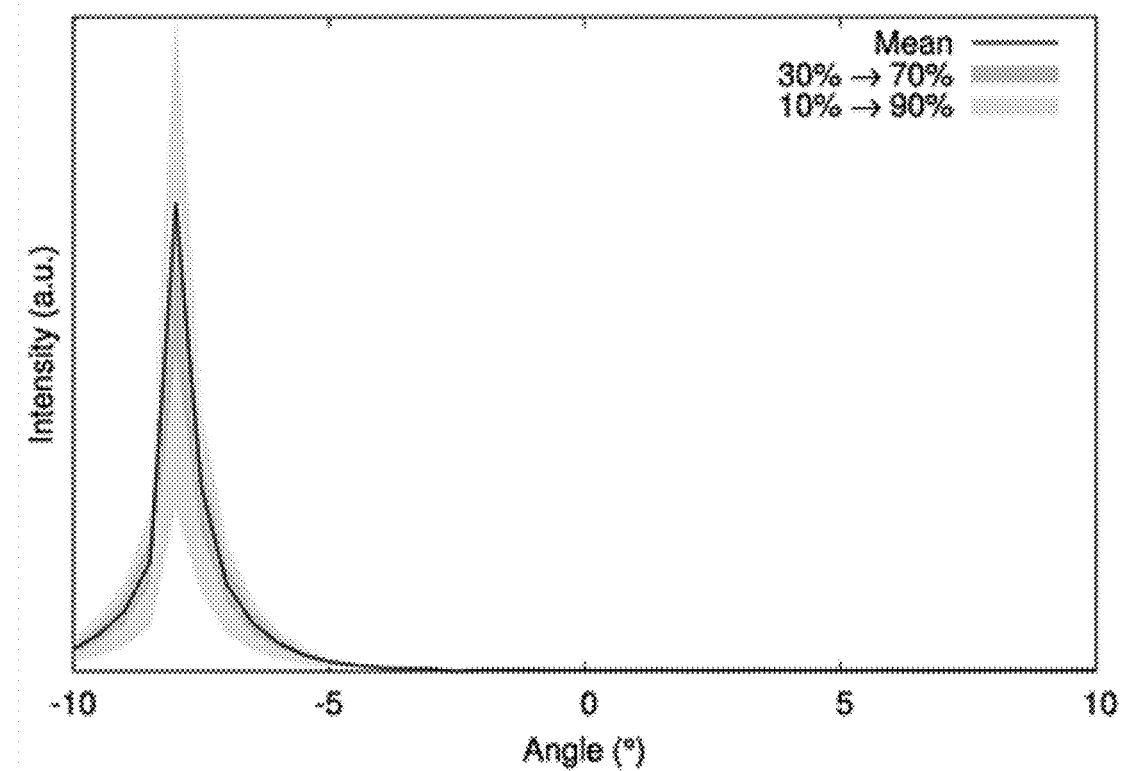
Figure 11A:
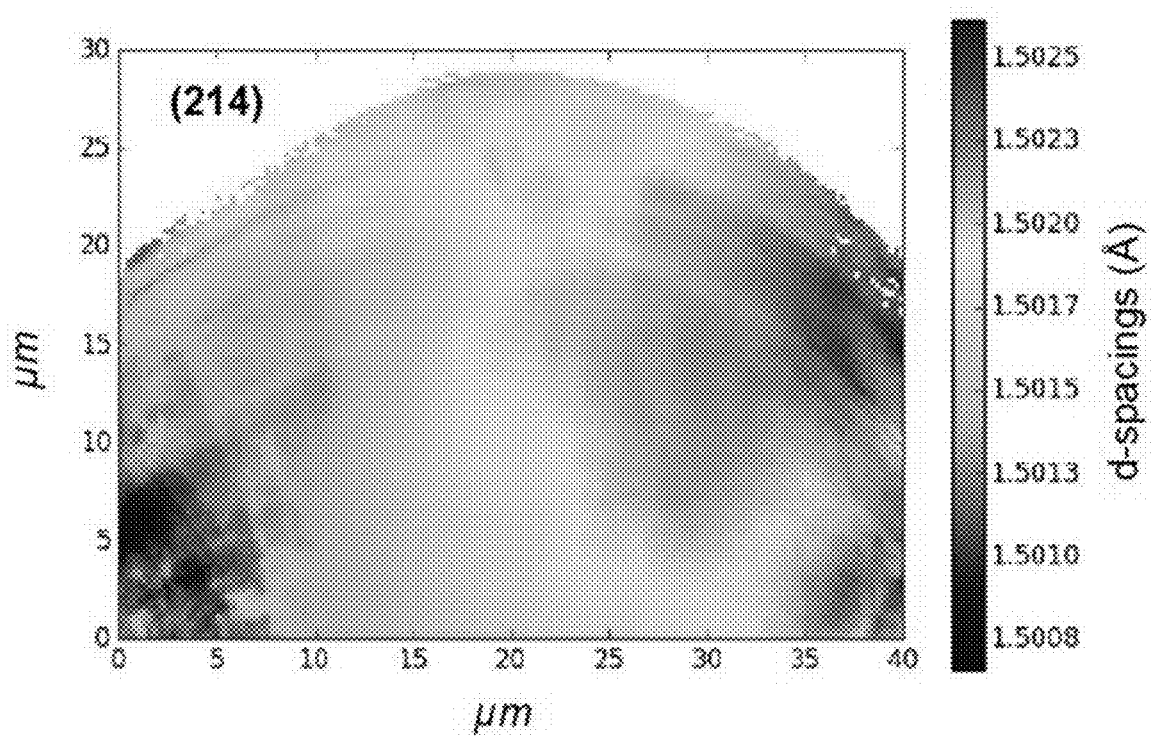
FIGS. 11A-D present pictures of synchrotron submicron scanning diffraction and nanotomography. A d-spacings map of a single lens area of the (214) reflection (FIG. 11A), SAXS intensity map of the same lens (periodicities of ~2.5-16.5 nm) (FIG. 11B), SAXS signals from individual scanning positions reveal streaks elongated perpendicularly to the surface (white arrows) (FIG. 11C), numbering corresponds to the positions indicated in FIG. 11B, and nanotomographic map revealing alternating density layers (FIG. 11D). The inset (additional sample) shows a crack deflection resulting from the different density layers.

The inventors also performed submicron synchrotron scanning X-ray diffractometry on cross sections of intact lens arrays, utilizing a beam spot size of approximately 180 nm×150 nm. Not only did this procedure verify that the entire lens array is a single crystal (FIGS. 10A-B), but the inventors could also observe local variations of ±0.1% in the lattice parameters as can be seen from the maps of the various d-spacings (FIG. 11A).

The strengthening and toughening of these otherwise brittle lenses depend upon coherent magnesium-rich calcite nanoparticles within a lower-magnesium single crystal of calcite. These nanoparticles exert compressive strains on the matrix but are themselves under a high tensile strain. Because of the coherent interface prior to heat treatment, the presence of two distinct phases is not detectable on HRPXRD. However, if the diffractogram is plotted with the intensity in logarithmic scale, a hump can be observed at the base of each of the diffraction peaks prior to annealing (FIGS. 8A and B). Line-profile analysis yields a nanoparticle size of about 5 nm. As the sample is heated and the particles grow, the coherent interface is eventually destroyed. The nanoparticles are very similar to those in coherent Guinier-Preston zones of classical metallurgy, which are formed by rapid cooling of a homogeneous alloy with limited solubility of one of the components at low temperatures. After quenching, the system is out of phase equilibrium and in a supersaturated solid solution state. As a result and owing to the low rate of diffusion at ambient temperature, coherent nanoprecipitates form in the matrix in a process termed 'aging' and exert strains.

The inventors believe that the brittlestar lens demonstrates a very similar strategy. The CaCO$_3$—MgCO$_3$ binary phase diagram reveals limited solubility of Mg (up to only a few Mg percent) in calcite at room temperature, after which dolomite is precipitated. It is reasonable to assume that the amorphous precursor is utilized in vivo as an alternative route to form supersaturated solid solutions, which allow for some precipitation of magnesium-rich calcium carbonate during or after crystallization.

Figure 12:
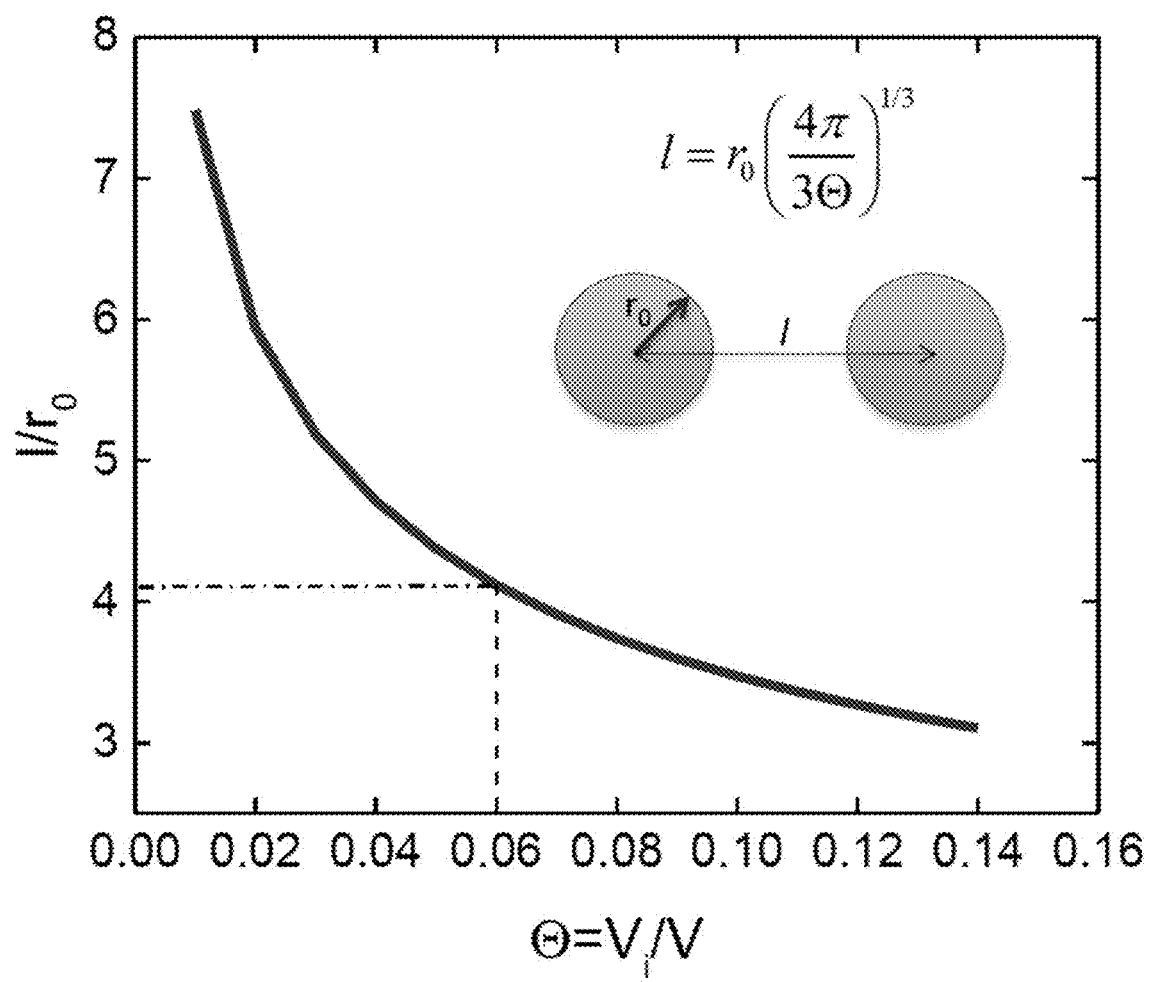
FIG. 12 presents a graph of the average distance between inclusions as a function of their volume fraction; as can be seen from the plotted curve at a precipitate volume fraction of 6% the average distance between particle surfaces is only 2r0.

Quantitative XRD data analysis of the heated samples reveals a volume fraction of ~8% magnesium-rich phase. This concentration may seem too low to exert coherent strains on the entire matrix; however, if the inventors consider a simple case in which the precipitates are spherical with a radius of $r_0$, then the distance between particles, l, is determined by their volume fraction, $\phi$: $l=r_0(4\pi/3\phi)^{1/3}$. For $\phi=0.06$, the distance $l=4r_0$ (FIG. 12) and the distance between particle is only $2r_0$. Based on TEM and XRD the inventors can estimate $2r_0$ to be ~5 nm. Bearing in mind that the strain caused by an isolated spherical coherent inclusion in the matrix decreases with distance according to the law $(r_0/r)^3$, the average strain of the matrix caused by the ensemble of coherent inclusions can be estimated as $3Z(q^3-1)^{-1}\ln q \Delta\varepsilon_{ij}^c$, where $\Delta\varepsilon_{ij}^c$ is the maximum coherent strain near the inclusion/matrix interface, $q=l/r_0$, and Z is the coordination number of a precipitate (the inventors used Z=6). If the precipitate volume fraction $\phi\sim0.08$, the average coherent strain of the matrix may reach a magnitude of $\sim0.5\Delta\varepsilon_{ij}^c$. The average macroscopic strain in a stress-free bulk crystal containing a homogeneous distribution of coherent magnesium-rich inclusions is $\overline{\varepsilon_{kl}}=\varepsilon_{kl}^0\phi$, where $\varepsilon_{kl}^0$ is the stress-free strain of the inclusion phase (transformation strain). This macroscopic strain consists of elastic and inelastic components. Inelastic strain caused by transformation strain of inclusions, $\varepsilon_{kl}^0$, can be accompanied by substantial internal coherent strains, with corresponding tensile stresses in the particles and compressive stresses in the matrix. Because of the small particle size, the particles can withstand relatively large tensile stresses against coherence loss. As known from metallurgical Guinier-Preston zones, the stresses arise due to the presence of coherent interface. When a growing coherent inclusion reaches a certain critical size, the elastic energy becomes high enough to induce relaxation processes and the coherence is lost. The nanoparticles' critical size for coherency loss is evaluated from 20 to 40 nm. This is what is seen in FIG. 3C, where the nanoparticles grow while at the same time the strains in the particles (tensile) and in the matrix (compressive) are relaxed.

To estimate the absolute strain in the matrix the inventors need to know the magnesium concentrations in both the matrix and the nanoparticles in order to derive their elastic constants and the difference in their lattice parameters that leads to the lattice mismatch. Assuming that for nanoparticles $\phi=8\%$ and that their composition is close to 40 mol % magnesium, this yields a matrix concentration of $\eta_{matrix}=13.3(1)$ mol % magnesium ($\eta_{avg}=\phi\eta_p+(1-\phi)\eta_{matrix}$). Using a Mori-Tanaka homogenization scheme, the inventors evaluated the average hydrostatic elastic strain within the nanoparticles as ~2.3% and within the matrix ~−0.1%. These coherent strains may result in an average compressive hydrostatic stress of ~−170 MPa in the matrix. At first glance these figures appear to be high; however, considering the precipitate size to be ~5 nm, can be concluded that the strain state is very similar to that of a thin epitaxial layer that often contains misfits of this order even for calcium carbonate.

Figure 11B:
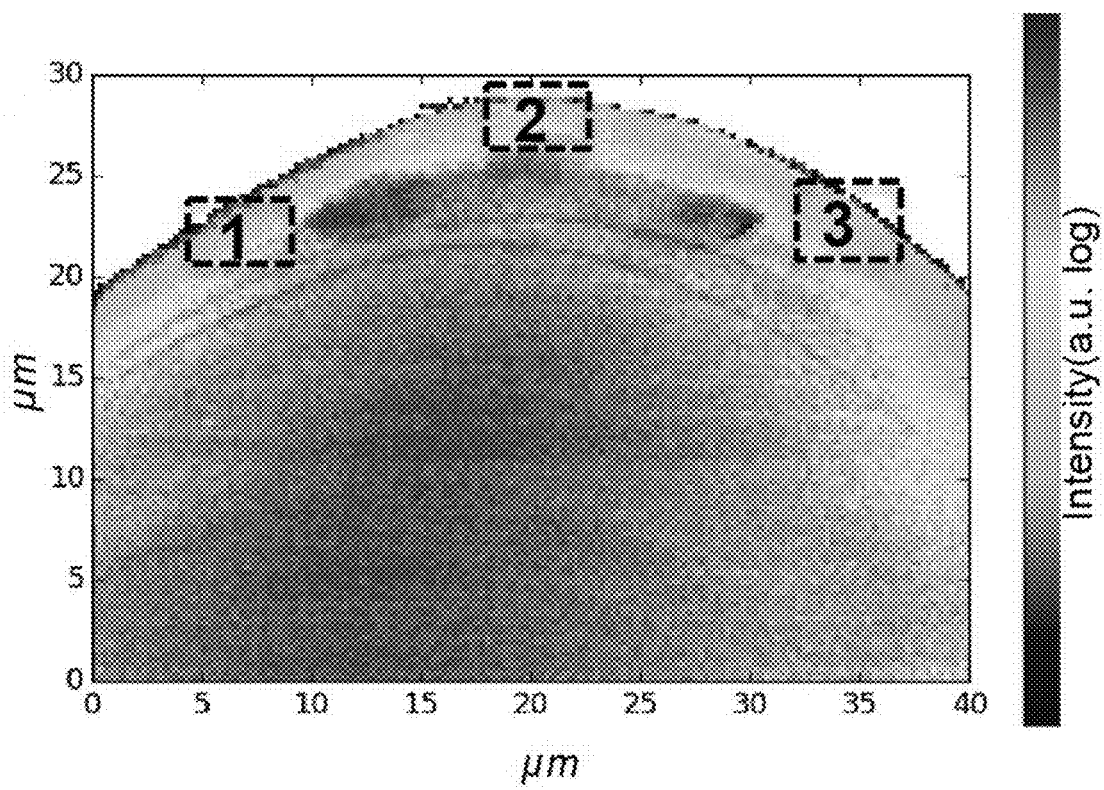
Figure 11C:
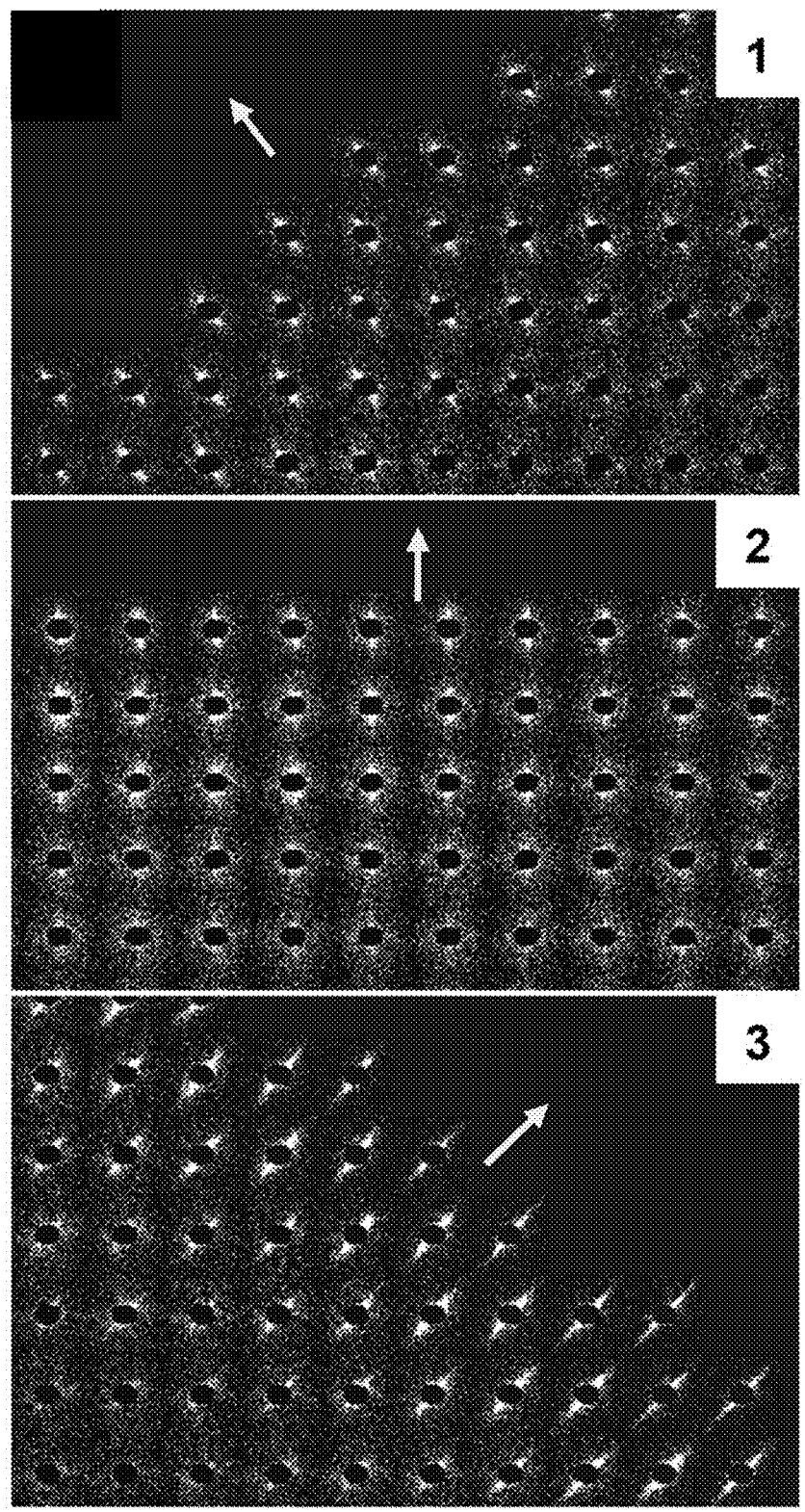
Figure 13A:
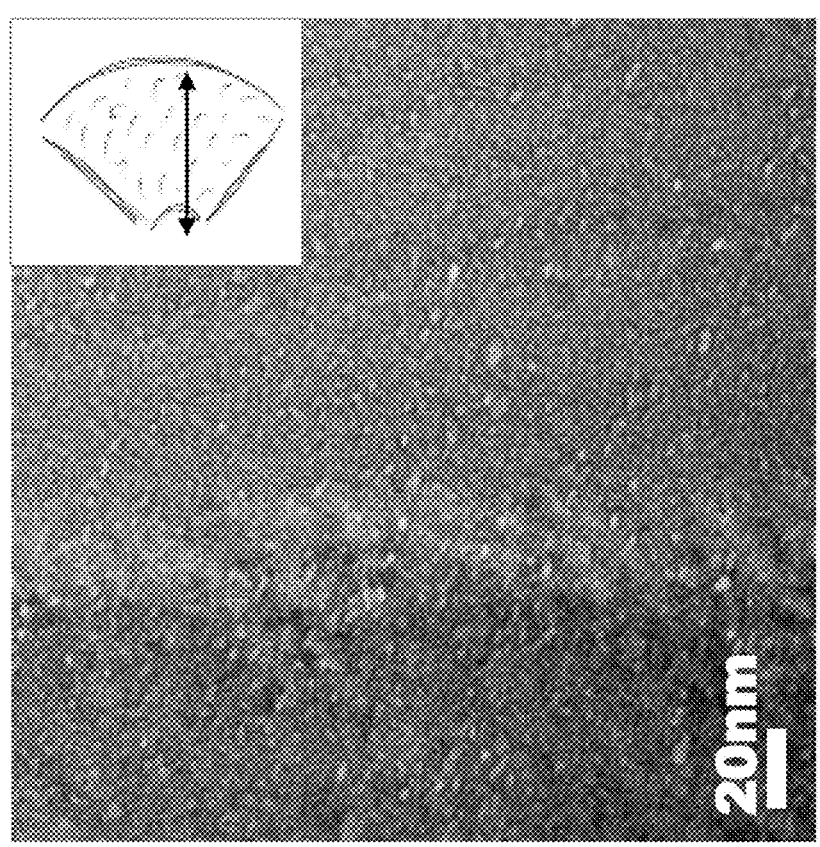
FIGS. 13A-B present TEM imaging from different orientations indicating platelet-like shape of the nanoprecipitates; TEM bright field mode images of the sample cut in horizontal direction (FIG. 13A) and vertical direction (FIG. 13B). As can be seen nanoprecipitates have more roundish shape when observed from horizontal direction and are more elongated when observed from vertical direction. The latter implies that nanoprecipitates are most likely nanoplatelets.
Figure 13B:
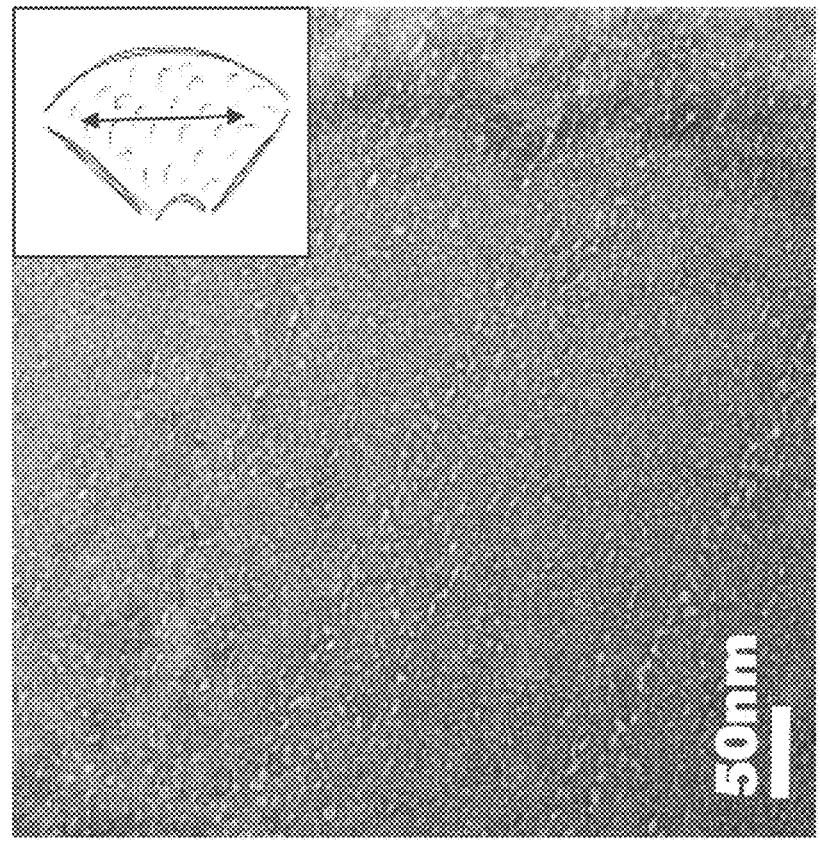

From the TEM imaging seen from different orientations it seems that the nanoprecipitates have a platelet-like shape (FIGS. 13A and B). This is confirmed by the small-angle X-ray scattering (SAXS) signal that was derived from submicron scanning diffractometry and revealed streak-shaped signals, supporting the platelet-like shape. Notably, it is only in certain distinct layers within a single lens that the inventors see an orientation of the SAXS signal, but as the curved surface is approached a strongly oriented streak-like SAXS signal can indeed be observed, indicating that the platelets are oriented with their flat surfaces parallel to the lens surface (FIGS. 11B and C).

This alignment is most probably attributable to surface image forces known to affect precipitate orientation, because the coherence strains are much more readily relaxed at the free surface of a crystal than at its interior. In addition, SAXS reveals ordered regions slightly beneath the curved surface in curved lines parallel to the surface (FIG. 11B). The same images also reveal a zone of lower SAXS intensity closer to the surface (FIG. 11B, green-blue color). This zone resembles a precipitate depletion zone that could correspond to what is known in metallurgy as a precipitate-free zone. In the composition field, such segregation sets up a fluctuation that is perpendicular to the free surface and which develops to form alternating magnesium-rich and magnesium-depleted layers parallel to the surface, a phenomenon known as surface-directed spinodal decomposition. Most interestingly, observation of the lattice parameter map from the same lens (FIG. 11A) reveals alternating lattice parameters that correspond to the features observed by SAXS (FIG. 11B).

The inventors performed indentation measurements and synchrotron nanotomography of a single lens after inducing cracks in it by mechanical cutting. From the indentation experiments the inventors were able to derive the values of the elastic constants and the hardness (Table 4).

TABLE 4

Estimated modulus and hardness values at different loads and loading rates.

| Sample | Number of indentations | Loading rate dP/dt (mN/min) | Maximum load $P_{max}$ (mN) | Modulus ± SD E (GPa) | Hardness ± SD H (GPa) |
|---|---|---|---|---|---|
| Lenses (001) | 25 | 50 | 100 | 68.9 ± 11.5 | 7.46 ± 1.62 |
| Geocalcite (001) | 10 | 50 | 100 | 93.89 ± 17.76 | 4.32 ± 1.06 |
| Heat-treated lenses (001) For comparison | 20 | 50 | 100 | 36.13 ± 2.8 | 3.52 ± 1.02 |
| Biogenic calcite | 30 | 2.5 | | 70.1 ± 1.5 | 3.47 ± 0.2 |
| | | | | 74.9 ± 0.7 | 4.19 ± 0.3 |
| Geocalcite (001) | | | | 67.5 ± 1.1 | 2.30 ± 0.1 |
| | | | | 76.9 ± 3.1 | 2.46 ± 0.03 |

To estimate $K_{IC}$ of the samples the inventors used the classical Lawn Evans Marshall model. Though this model was primarily developed for polycrystalline materials, the comparison of $K_{IC}$ of various single crystals is possible. The inventors performed the indentation measurements on the uppermost polished surface of the lenses, which corresponds to the [001] crystallographic direction of calcite and hence the inventors could compare our results to those obtained for [001]-cut and polished geological calcite. The inventors found that the $K_{IC}$ in brittlestar lens increased by more than two-fold (2.21) relative to the geological counterpart, from 0.19±0.06 to 0.42±0.08 MPa·m$^{1/2}$ (Table 5).

TABLE 5

The fracture toughness estimated from the measured mechanical properties.

| Sample | Number of indentations used | Fracture toughness ± SD, (MPa·m$^{1/2}$) $K_{IC}$ Maximum crack length | Fracture toughness ± SD, (MPa·m$^{1/2}$) $K_{IC}$ Minimum crack length | Fracture toughness ± SD, (MPa·m$^{1/2}$) $K_{IC}$ Average crack length |
|---|---|---|---|---|
| Lenses (001) | 8 | 0.34 ± 0.08 | 0.51 ± 0.14 | 0.42 ± 0.08 |
| Heat-treated lenses (001) | 8 | 0.24 ± 0.05 | 0.38 ± 0.05 | 0.31 ± 0.05 |
| Geocalcite (001) | 8 | 0.09 ± 0.06 | 0.28 ± 0.11 | 0.19 ± 0.08 |

Figures 14A, 14B:
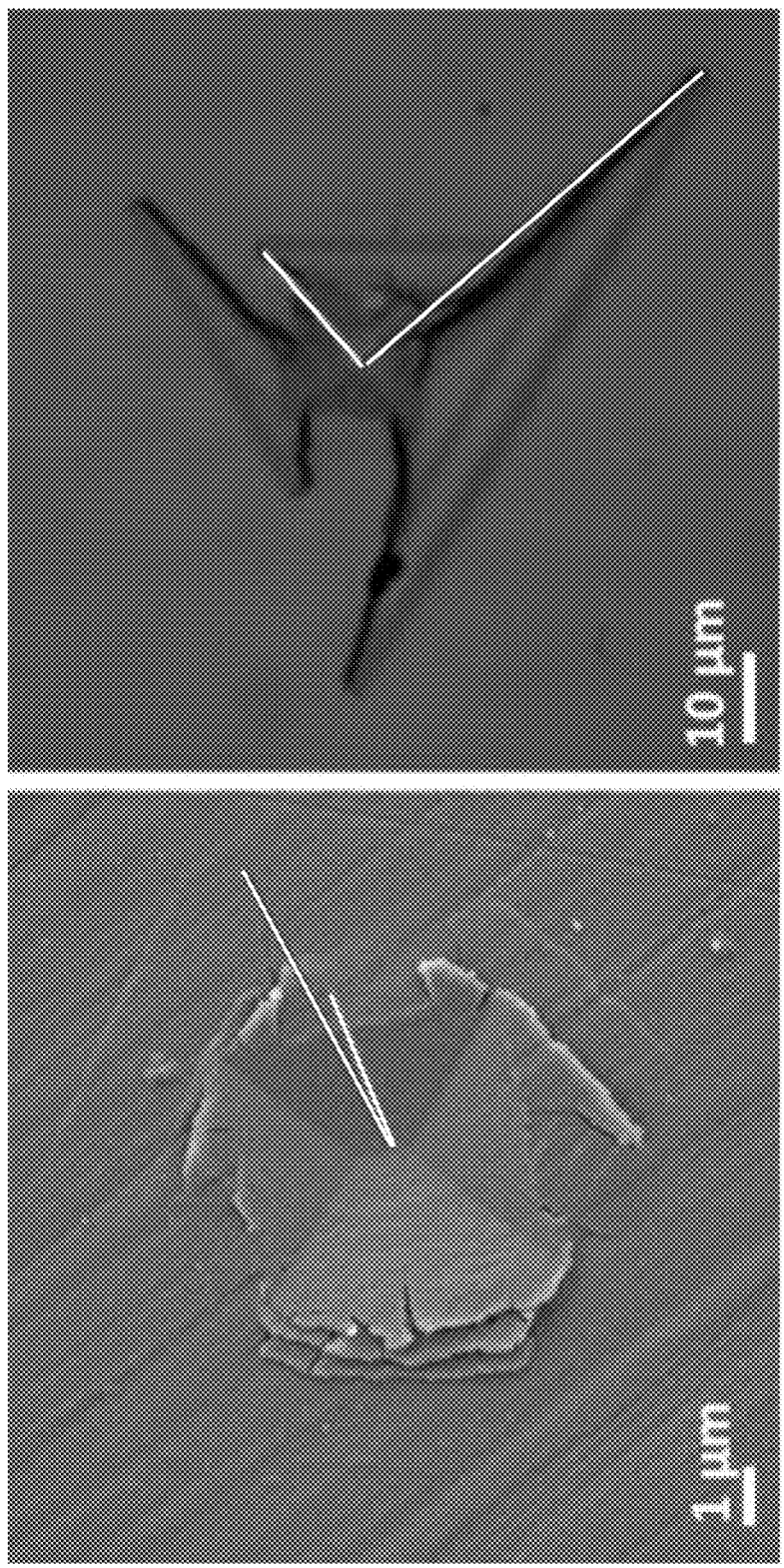
FIGS. 14A-B present representative images of indentations with corresponding crack size measurements (longest and shortest of the cracks) for (001) in calcite from brittlestar lenses (left, scanning electron microscope image) and in geocalcite (001) (right, optical microscope image)
Figure 15B:
FIGS. 15A-B present SEM images of indentations in the lenses annealed during 1 h at 400° C. Scale bar is 5 μm.
Figure 15A:

These values are of the same order as those determined for geological calcite (Table 5), although the absolute values obtained in different studies obviously cannot be compared. The indentation trace shows a layering structure, which is not observed in the geological counterpart (FIGS. 14A-B) and is probably a result of cracks that propagate parallel to the alternating layers observed in FIG. 2F and FIGS. 11A, B, and D. Indentation on the heat-treated lenses (FIGS. 15A-B) demonstrated that after annealing the hardness (Table 4) and the fracture toughness (Table 5) decreased by 50 and 25%, respectively, as expected. The fracture toughness after annealing is yet 1.63 times that of geological calcite.

Figure 11D:
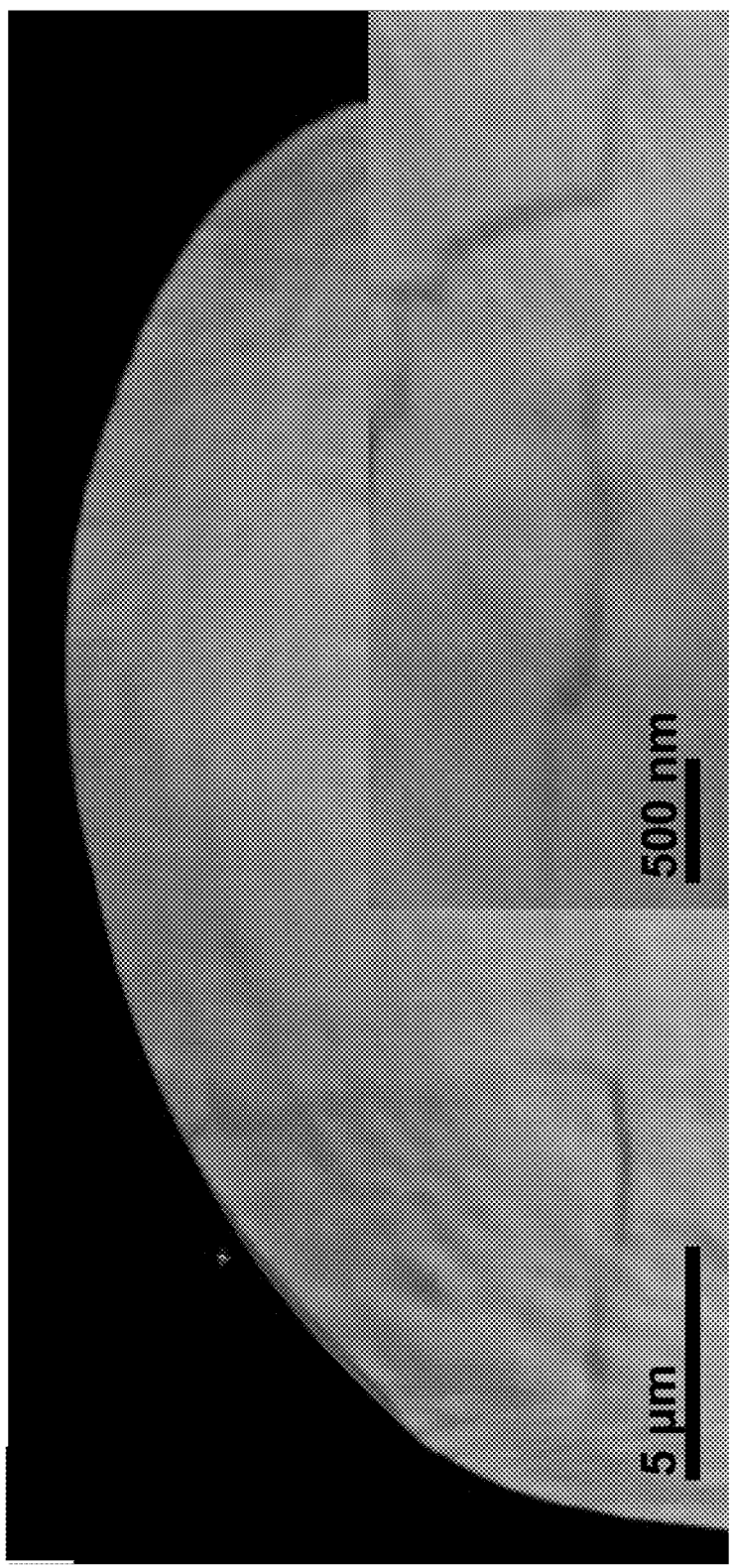

NanoCT of a single lens revealed that the lens has several alternating layers of density (indicated by the brightness in phase contrast in FIGS. 2F and 11D). The alternating densities are probably due to the different concentrations of magnesium-rich nanoprecipitates that coincide with the diffraction-mapping features. A varying density of nanoprecipitates results in varying degrees of compressive stress in the lens, as indicated by the scanning diffractometry (FIGS. 11A and B), the inventors would expect then a propagating crack to become more retarded and more deflected as the compressive stress increases. FIG. 11D (inset) shows that the crack indeed deflects each time it approaches a varying density layer. Such crack deflection thus provides further evidence of enhanced toughness owing to the Guinier-Preston-like precipitates within the matrix, however the layered structure can also contribute to the enhancement in mechanical properties. Here the inventors should stress that Guinier-Preston zones in metals lead to an increase in hardness, strength and brittleness by mitigating dislocation motion, while in calcite toughness and strength are enhanced via a different mechanism, namely mitigation of cracks.

Figure 16C:
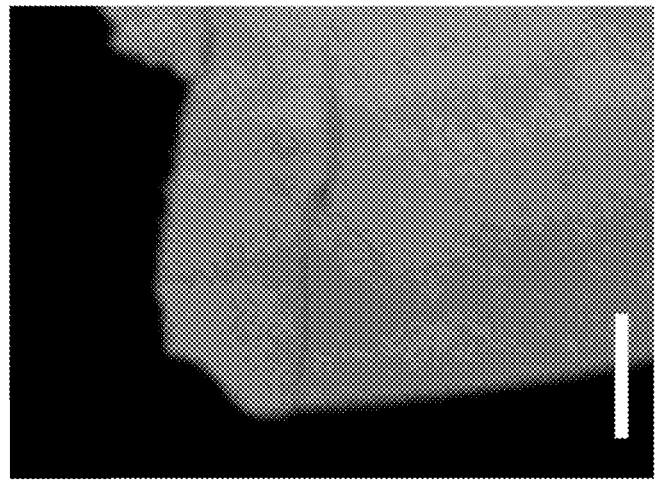
FIGS. 16A-C present images of nanotomographic maps obtained from different depths (B is 200 nm deeper than A and C is 200 nm deeper than B) demonstrating the deflection of a crack. Scale bar is 2 μm.
Figure 16B:
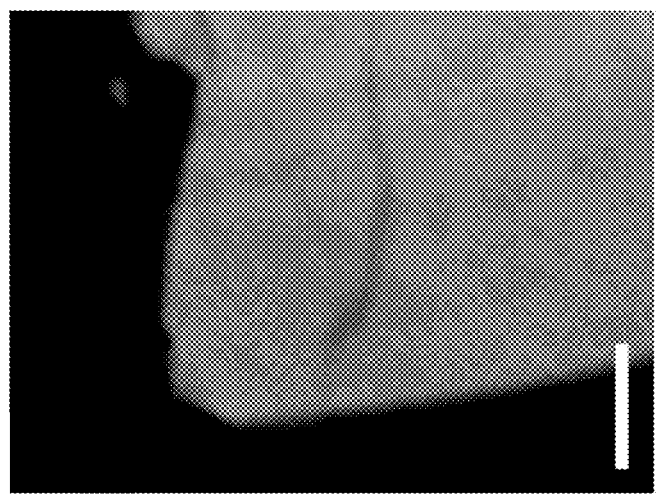
Figure 16A:
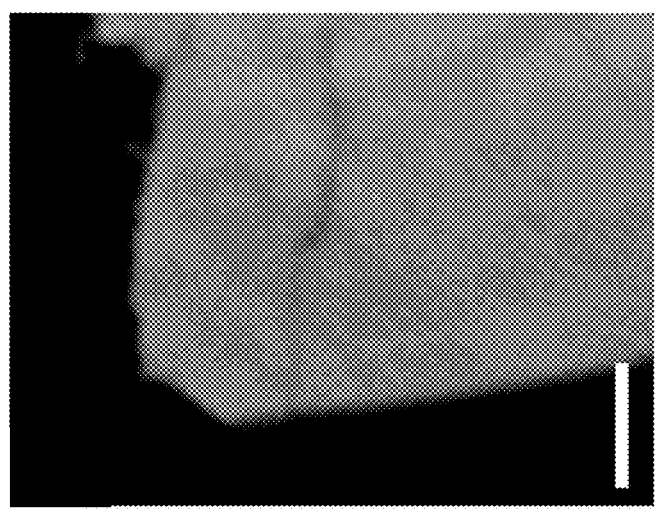

By considering the average crack deflection length $a_= = 300$-$500$ nm (along the layer interfaces of thickness $t \cong 250$ nm, see FIGS. 16A-C) in combination with the measured compressive strain and calculated compressive stress $\sigma_0 \cong -170$ MPa in the matrix, the inventors have developed a model to estimate the toughening $$\frac{K_{IC}^*}{K_{IC}}$$

resulting in:

$$\frac{K_{IC}^*}{K_{IC}} = (1 - \sigma_0/\sigma_C)\sqrt{1 + k a_=/t}$$

where $\sigma_C$ is the material strength in absence of pre-compression and k represents the ratio between mode II and mode I fracture energies, assumed to be close to unity. From the measured toughening of the heated (1.63, only due to crack deflection) and natural lenses (2.21, due to crack deflection and pre-compression) the inventors estimate $a_= \varepsilon 415$ nm (in perfect agreement with the observations, see FIGS. 16A-C), $\sigma_C$=472 MPa and thus $\sigma_C^{(\sigma_0)}$=$\sigma_C$-$\sigma_0$=642 MPa the strength of the natural lenses, thus with a strengthening, only due to pre-compression, of 1.36. The measured toughening of 2.21 and estimated strengthening of 1.36 undoubtedly represent a considerable simultaneous increases in both the fracture toughness and strength of calcite, the latter which is typically on the order of a few tens of MPa for geological calcite.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A ceramic composition comprising a plurality of at least semi-coherent particles with an average diameter ranging from 1 nm to 50 nm included within a matrix, wherein:
   a. said matrix comprises one metal carbonate salt, and a metal oxide or metalloid oxide;
   b. said particles and said matrix share at least one metal element and
   c. said composition has a lattice mismatch of less than 5%, wherein said matrix comprises a calcium rich matrix wherein the calcium content is 30 mol % to 99 mol % of the total metal content of said matrix and said particles comprise magnesium rich particles.

2. The composition of claim 1, wherein said matrix is crystal matrix.

3. The composition of claim 1, having a Young's modulus of at least 50 GPa.

4. The composition of claim 1, having a hardness of at least 1 GPa.

5. The composition of claim 1, wherein the concentration of magnesium in said particles is in the range of 30 mol % to 98 mol %, and wherein mol % refers to a cation mole fraction.

6. The composition of claim 1 wherein said matrix comprises calcium carbonate.

7. The composition of claim 1, wherein said matrix comprises magnesium.

8. The composition of claim 7, wherein the concentration of magnesium in said matrix is in the range of 1 mol % to 30 mol % of the total metal content of the matrix.

9. The composition claim 1, wherein said particles have an average diameter in the range of 1 nm to 20 nm.

10. The composition of claim 1, wherein said particles have an average diameter in the range of 1 nm to 9 nm.

11. The composition of claim 1, comprising at least two layers.

12. An article comprising the composition of claim 1.

13. A method for making the ceramic composition of claim 1, comprising the steps of:
   a. mixing at least two amorphous materials;
   b. providing conditions for said amorphous materials undergo spinodal decomposition and allowing crystallization under a controlled manner.

14. The method of claim 13, wherein said amorphous materials are soluble above a critical temperature.

15. The method of claim 13, wherein said amorphous materials are soluble in each other in the crystalline phase.

16. The method of claim 13, wherein said at least two amorphous materials are used in a ratio of 1:99 to 99:1.

* * * * *